US010447853B1

(12) United States Patent
Ouimette et al.

(10) Patent No.: US 10,447,853 B1
(45) Date of Patent: Oct. 15, 2019

(54) GRAPHICAL USER INTERFACE FOR MANAGING MULTIPLE AGENT COMMUNICATION SESSIONS IN A CONTACT CENTER

(71) Applicant: Noble Systems Corporation, Atlanta, GA (US)

(72) Inventors: Jason P. Ouimette, Berkeley Lake, GA (US); Deborah L. Nilsen, Lilburn, GA (US); Jason S. Conner, Stockbridge, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 15/393,509

(22) Filed: Dec. 29, 2016

(51) Int. Cl.
*H04M 3/00* (2006.01)
*H04M 5/00* (2006.01)
(Continued)

(52) U.S. Cl.
CPC ...... *H04M 3/5133* (2013.01); *G06F 3/04817* (2013.01); *G06F 3/04842* (2013.01);
(Continued)

(58) Field of Classification Search
CPC .. H04M 3/5191; H04M 3/5183; H04M 3/523; H04M 3/5166; H04M 3/5233;
(Continued)

(56) References Cited

U.S. PATENT DOCUMENTS 5,621,789 A 4/1997 McCalmont
6,332,154 B2 12/2001 Beck et al.
(Continued)

FOREIGN PATENT DOCUMENTS

WO WO 02/09406 1/2002

OTHER PUBLICATIONS

Notice of Allowance Received for U.S. Appl. No. 15/485,568 dated Apr. 25, 2018.
(Continued)

*Primary Examiner* — Quynh H Nguyen
*Assistant Examiner* — Kharye Pope

(57) ABSTRACT

A communications handler receiving incoming communications determines an appropriate contact center agent to receive the communication and modifies a graphical user interface ("GUI") to notify the agent of the incoming communication. A plurality of communication session indicators provide status information for various communication sessions, and allow the agent to select one of several simultaneous communication sessions, which in turn alters the GUI to present information about that selected communication session. By selecting the corresponding communication session identifier, the agent can replace information for one communication session with another. The communication session indicators are updated to reflect the corresponding status of the communication session. The communication sessions include voice and non-voice channel types, wherein the non-voice channel types may include chat sessions, text sessions, and email sessions. Agent session data accessed by the communications handler allows selection of agents authorized and available to handle the incoming communication session.

20 Claims, 24 Drawing Sheets

(51) Int. Cl.
| | |
|---|---|
| *H04M 3/51* | (2006.01) |
| *H04M 3/523* | (2006.01) |
| *H04M 3/42* | (2006.01) |
| *G06F 3/0484* | (2013.01) |
| *G06F 3/0481* | (2013.01) |
| *H04L 12/66* | (2006.01) |

(52) U.S. Cl.
CPC ..... *H04M 3/42042* (2013.01); *H04M 3/5183* (2013.01); *H04M 3/523* (2013.01); *H04M 2203/256* (2013.01); *H04M 2203/551* (2013.01)

(58) Field of Classification Search
CPC ......... H04M 3/5133; H04M 2203/551; H04M 2201/38; H04M 3/42059; H04M 3/5141; H04M 3/42382; H04M 2203/402; H04M 3/5232; H04M 2203/404; H04M 3/42042; H04M 3/04; H04L 51/32; H04L 63/0876; H04L 65/1083; H04L 67/02; H04L 51/04; H04Q 2213/13389; H04Q 3/64
USPC .............. 379/265.09, 265.02, 265.12, 265.1, 379/265.11, 265.01, 265.13, 266.08, 379/88.13, 93.23; 705/304, 7.14; 709/206
See application file for complete search history.

(56) References Cited

U.S. PATENT DOCUMENTS

| | | | |
|---|---|---|---|
| 6,389,132 B1 | 5/2002 | Price | |
| 6,704,409 B1 * | 3/2004 | Dilip | H04M 3/523 379/243 |
| 6,771,760 B1 | 8/2004 | Vortman et al. | |
| 6,934,381 B1 | 8/2005 | Klein et al. | |
| 6,978,136 B2 | 12/2005 | Jenniges et al. | |
| 7,308,093 B2 | 12/2007 | Annadata et al. | |
| 7,315,616 B2 | 1/2008 | Annadata et al. | |
| 7,337,158 B2 | 2/2008 | Fratkina et al. | |
| 7,353,182 B1 | 4/2008 | Missinhoun et al. | |
| 7,373,410 B2 | 5/2008 | Monza et al. | |
| 7,418,094 B2 | 8/2008 | Golitsin et al. | |
| 7,542,561 B1 * | 6/2009 | Jabbour | H04M 3/5232 379/265.01 |
| 7,606,909 B1 * | 10/2009 | Ely | G06Q 10/02 379/93.09 |
| 8,855,292 B1 | 10/2014 | Brunson | |
| 8,873,737 B2 | 10/2014 | Moran et al. | |
| 8,929,536 B2 | 1/2015 | Mathur et al. | |
| 8,958,542 B1 | 2/2015 | Kaufman | |
| 9,292,861 B2 | 3/2016 | Spievak et al. | |
| 9,407,768 B2 | 8/2016 | Conway et al. | |
| 9,742,916 B1 | 8/2017 | Christopher | |
| 10,142,476 B1 | 11/2018 | Chen | |
| 2002/0060988 A1 | 5/2002 | Shtivelman et al. | |
| 2004/0218749 A1 | 11/2004 | Shaffer et al. | |
| 2005/0100159 A1 * | 5/2005 | Fink | H04M 3/36 379/265.11 |
| 2006/0245577 A1 | 11/2006 | Mancuso et al. | |
| 2006/0262921 A1 | 11/2006 | Eppel et al. | |
| 2007/0280460 A1 | 12/2007 | Harris et al. | |
| 2008/0037764 A1 | 2/2008 | Lee et al. | |
| 2008/0118051 A1 * | 5/2008 | Odinak | H04M 3/42221 379/265.09 |
| 2008/0175374 A1 | 7/2008 | Lauridsen et al. | |
| 2009/0245500 A1 * | 10/2009 | Wampler | H04M 3/42382 379/265.09 |
| 2010/0325216 A1 * | 12/2010 | Singh | G06Q 10/0637 709/206 |
| 2011/0153378 A1 | 6/2011 | Costello et al. | |
| 2013/0051545 A1 | 2/2013 | Ross et al. | |
| 2013/0060871 A1 * | 3/2013 | Downes | H04L 51/066 709/206 |
| 2013/0094647 A1 | 4/2013 | Mauro et al. | |
| 2013/0129074 A1 | 5/2013 | Peterson et al. | |
| 2013/0173687 A1 * | 7/2013 | Tuchman | G06Q 30/0601 709/202 |
| 2013/0282844 A1 | 10/2013 | Logan et al. | |
| 2014/0089822 A1 | 3/2014 | Wu et al. | |
| 2014/0140495 A1 | 5/2014 | Ristock et al. | |
| 2014/0161249 A1 | 6/2014 | Tolksdorf | |
| 2014/0279718 A1 * | 9/2014 | Southey | G06N 5/04 706/11 |
| 2014/0282083 A1 | 9/2014 | Gaetano | |
| 2014/0282125 A1 * | 9/2014 | Duneau | G06F 3/0481 715/762 |
| 2014/0307863 A1 * | 10/2014 | Snyder | H04M 3/5233 379/265.09 |
| 2015/0049869 A1 | 2/2015 | Petrovykh et al. | |
| 2015/0163361 A1 | 6/2015 | George | |
| 2015/0289130 A1 * | 10/2015 | Aleksin | G06Q 30/016 455/404.1 |
| 2015/0334233 A1 | 11/2015 | OConnor et al. | |
| 2016/0034930 A1 | 2/2016 | Verschoor et al. | |
| 2016/0099892 A1 * | 4/2016 | Palakovich | H04L 51/04 709/206 |
| 2016/0150084 A1 | 5/2016 | Hickey et al. | |
| 2016/0212266 A1 * | 7/2016 | Soundar | H04M 3/5235 |
| 2016/0344869 A1 * | 11/2016 | Patel | H04L 51/066 |
| 2016/0349960 A1 * | 12/2016 | Kumar | G06F 3/04817 |
| 2016/0381091 A1 * | 12/2016 | O'Connor | H04L 65/403 370/260 |
| 2017/0118341 A1 * | 4/2017 | Kelly | H04M 3/5141 |
| 2018/0063325 A1 * | 3/2018 | Wilcox | G09B 21/001 |
| 2018/0084111 A1 | 3/2018 | Pirat et al. | |
| 2018/0115644 A1 | 4/2018 | Al-Khaja | |
| 2018/0376003 A1 | 12/2018 | Shinseki | |

OTHER PUBLICATIONS

U.S. Appl. No. 15/248,013 Office Action, dated Mar. 12, 2018, 36 pages.
U.S. Appl. No. 15/485,568, USPTO Notice of Allowance dated Apr. 25, 2018, 17 pages.
U.S. Appl. No. 15/248,013, USPTO Examiner Interview Summary, dated Aug. 28, 2018, 4 pages.
U.S. Appl. No. 15/248,013, USPTO Office Action dated Jun. 29, 2018, 33 pages.
U.S. Appl. No. 15/389,477 Office Action, dated Mar. 26, 2018, USPTO, 66 pages.
Office Action Received for U.S. Appl. No. 15/791,512 dated Feb. 19, 2019.
Office Action Received for U.S. Appl. No. 15/791,512 dated Apr. 5, 2019.
Notice of Allowance Received for U.S. Appl. No. 16/008,243 dated Jul. 17, 2019.
Notice of Allowance Received for U.S. Appl. No. 15/791,512 dated Aug. 21, 2019.

* cited by examiner

Agent Session Authorization Table 1100

| Agent 1105 | Max # of Voice Calls 1110 | Max # of Text Session 1115 | Max # of Chat Sessions 1120 | Max # of Email Sessions 1125 | Voice Only 1130 | Non-Voice Only 1135 | Max # Sessions 1140 |
|---|---|---|---|---|---|---|---|
| Dawn Hardy 1106 | 1 | 0 | 0 | 0 | Yes | No | 1 |
| Tom Doe 1107 | 1 | 1 | 2 | 2 | No | No | 2 |
| Jane Graham 1108 | 0 | 2 | 2 | 3 | No | Yes | 3 |
| Chris McDaniel 1109 | 1 | 2 | 2 | 2 | No | No | 4 |

FIG. 11

| Channel Type | | Current Active Channels | Scheduled Channels/Campaign | De-Assign Channel |
|---|---|---|---|---|
| Voice | Voice #1 | ∫ | Cust. Svc. | ☐ |
| Non-Voice | Email #1 | ∫ | Cust. Svc. | ☐ |
| | Email #2 | | Returns | ☐ |
| | Chat #1 | ∫ | Returns | ✓ |
| | Chat #1 | ∫ | Returns | ☐ |
| | Text #1 | ∫ | Returns | ☐ |

FIG. 21

GRAPHICAL USER INTERFACE FOR MANAGING MULTIPLE AGENT COMMUNICATION SESSIONS IN A CONTACT CENTER

BACKGROUND

Early call centers were structured around handling voice calls, which may have been inbound, outbound, or combination of inbound/outbound calls. While voice calls are a common way of engaging with customers, modern call centers now handle many other types of communication channels. In addition to voice, various data oriented channels (i.e., non-voice) may be supported, such as email, texts (SMS), social media, fax, and web-based chat. Furthermore, call centers managing these additional channel types are now usually called "contact centers" to reflect that they support many different methods of engaging with customers, as opposed to only handling voice-type calls.

Today's contact center agents are experienced in handling various channel types to engage a customer. The non-voice channels may demand less real-time attention from the agent when interacting on that channel as compared to a voice channel. For example, an agent interacting with a customer using email may pause after receiving it, perform an ancillary task, and carefully compose a response. It would not be unusual for an agent to respond to an email twenty minutes after receiving it. Further, a twenty minute response time is likely acceptable to the customer. However, voice channels typically demand a higher level of attention of the agent when interacting with a customer. For example, an agent may pause for a few seconds in response to a customer's question, but the agent is expected to carry on a real-time conversation with the customer. Waiting twenty minutes to respond to a customer inquiry on a voice call would not be acceptable.

Many agents today, as are many younger people, are experienced and sophisticated in performing simultaneous multiple tasks ("multi-tasking"), particularly when this involves interacting with a computer. Thus, it may be possible for an agent to engage in multiple simultaneous chat sessions with multiple customers. Or, engage in a voice call with one customer while interacting with another customer via email or some other non-voice channel.

Whenever an agent is interacting with a customer in a contact center, the agent typically has certain information presented to him or her on a computer screen to assist them with the communication. That information may include information about the customer's account, prior communications with the customer, current outstanding balance, etc. Presenting this information in an effective form to an agent handling multiple communication sessions is challenging. An effective human interface is critical maintaining agent productivity. Prior art solutions have presented simultaneous detailed information about each communication session to the agent, which can cause "information overload" to the agent. In order to present all of this detailed information, multiple display monitors may be required. However, using multiple display monitors is expensive and consumes more desk space than one monitor. Finally, requiring multiple monitors allows so much information to be displayed to the agent that it can be challenging for the agent to readily locate the needed information. On the other hand, using a single display monitory may display too much information, resulting in a "crowded" information display, where information is not logically arranged, difficult to find, and typically too small in size for quick review and comprehension.

Displaying too much information to the agent regarding multiple communication sessions can cause the agent to be overwhelmed, and can degrade the interaction the agent has with each corresponding customer associated with each communication session. Further, presenting too much information to the agent may make it difficult for the agent to readily find the information desired for a particular communication session. Because the agent can be expected to shift their attention from one communication session to another, the agent can be expected to require access to different contextual information in a quick and easy to use manner.

Thus, systems and methods are needed to present information to the agent regarding multiple communication sessions, so that the agent can quickly ascertain what information is available for a communication session, and where to find it on the computer screen. The information should be accessible in an easy-to-use and intuitive manner, so as to minimize agent training time.

SUMMARY

In general, various embodiments disclosed herein for presenting information to an agent and management of multiple communications sessions that the agent may be involved with in a contact center. In one embodiment, a graphical user interface is divided into various panes with a first pane allowing the agent to select one of several communication sessions, each of which may use different channel types, and to then present further detailed information regarding that selected communication session to the agent. In another embodiment, the agent is presented with information regarding various communication sessions that the agent is involved with, and status information regarding each communication session. This information allows the agent to quickly ascertain the available communication sessions, which communication session is active, and the status of a particular communication session. The agent may select one communication session over another for reviewing further information about the selected communication session.

As is discussed in greater detail below, the subject matter disclosed herein may be implemented as a computer-controlled apparatus, a method, a computing system, or an article of manufacture, such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 2 illustrates one embodiment of a graphical user interface display screen presented to an agent with the various information regarding multiple communication sessions that the agent is involved with.

FIG. 11 illustrates one possible data structure for maintaining an agent session authorization data.

FIG. 13 illustrates one process flow for processing agent input selecting a communication session to interact with.

FIG. 21 represents one embodiment of a user interface for managing the number of channel types/communication sessions allocated to an agent.

DETAILED DESCRIPTION

Figure 1:
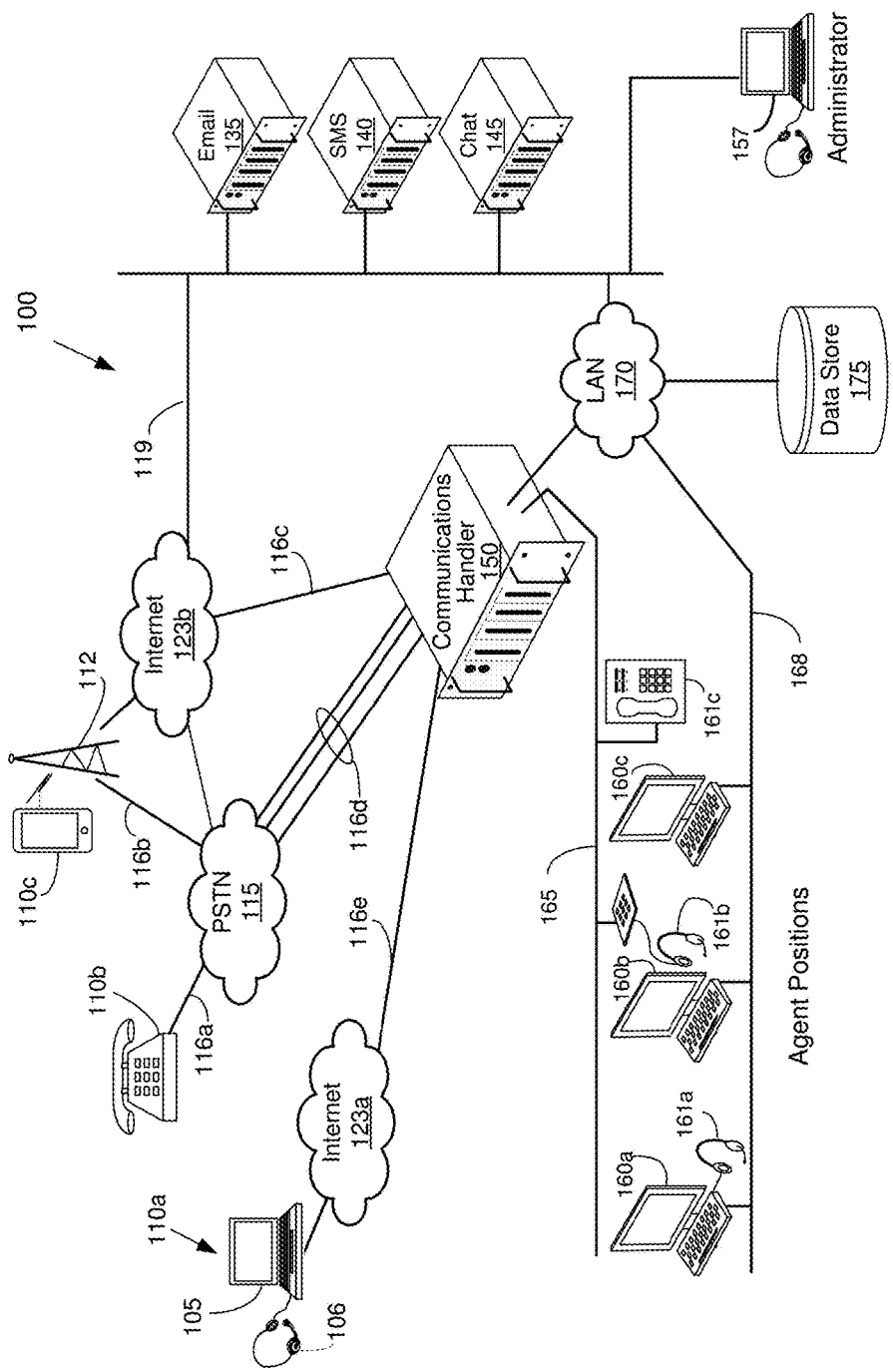
FIG. 1 illustrates an architecture of various components that may be used in one embodiment according to the concepts and technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Agents in call centers traditionally interacted with a single customer at a time using a voice channel. Today, the call center has evolved into a contact center, which are more sophisticated. Various channels types are handled and agents are able to multi-task with multiple customers simultaneously via multiple communication sessions. Further, these multiple communication sessions typically involve different channel types.

These channel types may include voice, email, chat, and text. Other channel types may be involved, such as fax and social media, but the principles and technologies herein can be illustrated using voice, email, chat and text as different examples of non-voice channel types. Reference to "chat" is also sometimes referred to as "web-chat", and refers to its usage in a contact center context. Reference to "text" is also referred to as "SMS" (short message service) text, and an instance may sometimes be referred to as a "text call."

Before examining these non-voice channels in further detail, several important aspects of a voice call must be noted. First, a voice communication session is usually intolerant of delay. By "delay", reference is made to the willingness of the customer to tolerate delay in receiving a response during a conversational dialogue. (Reference is not made to the delay of the underlying communication technology, though the underlying communications technology also does have to be intolerant of delays in handling audio in a voice call).

The person (also referred to generically as a customer herein) conversing with an agent expects the agent to respond in real time with respect to the dialogue, e.g., within a second or two. For example, if the customer asks the agent of the business' operating hours, the agent upon hearing this is expected to provide the customer with a timely response. Certainly, a delay of several minutes would not be tolerated in responding to this simple question. While the agent may not always know the information requested during a voice call and the agent may have to perform an inquiry offline to obtain the answer, the agent will nevertheless inform the party of this situation in order to set the customer's expectation. Thus, in all cases, a response of some sort is expected to be provided in real time in response to a verbal question.

Further, an incoming voice call (or a call that is transferred to an agent) requires an immediate response after the agent receives the call. Typically, contact center systems are designed to automatically route the call to an agent, or answer inbound calls, potentially play an announcement, and then transfer the caller to an agent after the agent is available. The caller, if waiting during this time, may hear music on hold or some other background information. However, once the call is routed/transferred to an agent, the agent is expected to respond fairly quickly. Typically, the agent will respond by saying "Hello," or some other form of initial greeting. Again, if the agent were to wait 20 seconds or so before saying "Hello", the customer would likely hang up, or would otherwise be upset with the delay. Consequently, when an incoming voice call is routed to the agent, the agent is expected to engage in the communication quickly.

In contrast to voice calls which require responses measured in seconds of fractions thereof, non-voice (or "data oriented") communication sessions typically do not demand such immediate responses by the agent. Typically, chats and text based dialogues demand a response from an agent measured in minutes. A sender of an email may expect a longer response time.

First, consider a chat interaction. A chat interaction may occur via a user interacting with a web site, which provides for a chat function. Here, the user is frequently interacting with a person computer and using a full size keyboard. These users typically can type a message faster than typing using a touch-screen smart phone. Hence, the nature of the dialogue may be more complicated than a text based dialogue. Chats are typically not limited to the 160 character limit of SMS texts. Further, chats may occur when the user is multitasking as well. Consequently, there users often have an expectation that a dialogue will involve response times longer than a voice call, and which may involve some moderate delay. A delay of 10-60 seconds may occur between each interaction between the agent and customer, and this would typically be viewed as acceptable.

Next consider an SMS (short message service) text (or simply "text"). A customer interacting via SMS is usually interacting with a hand-held smart phone, which requires a fair amount of interaction by the user. Texts are characterized by a rather quick transmission time, so that message is sent quickly, and typically the sender expects a rapid response. Because of the relative difficulty in the user interacting via a smart phone, this type of interaction reflects a level of urgency on the customer that requires a fairly quick response once the dialogue has been established. There may be different perspectives as to whether greater urgency is perceived when using chat for a dialogue or using texting.

Next, consider an email interaction. Sending an email may take a minute (or several minutes) to be received by the recipient. Typically, sending an email will not be transmitted or provided to the end recipient as fast as an SMS or chat message. Further, an email requires the recipient to open their email application, select the message, and then review it. Contrast this to chat or text, which typically is displayed to the user on their screen without requiring any additional efforts. Email is also typically used when composing a long message (greater than 160 characters). Further, email is typically not as practical when a lengthy dialogue or interaction is expected or required. For that, chat or texting is often preferred.

Of course, the above is a rough characterization of the relative urgency expected of these non-voice channels. In various circumstances, exceptions to these rules may exist or different expectation levels of interactiveness may exist. However, that does not alter the application of the principles and technologies presented herein, but illustrates that exceptions may occur.

The level of real-time interaction that is required or expected for these communication sessions has a bearing on how many communications sessions an agent may handle. This is also impacted by the channel type. As mentioned, voice is highly interactive, and typically an agent can handle only one voice call at a time. It is typically impractical for an agent to have two simultaneous voice calls and expect the agent to converse in real time with both parties. Even if the agent puts one party on hold while talking to another, an agent attempting a back-and-forth conversation between two parties would result in a poor experience for at least one party, or perhaps both parties.

Chat is less interactive than a voice call, so it may be possible for an agent to handle one voice call and one chat interaction simultaneously. In fact, it may be possible for an experienced agent to handle one voice call and multiple chat sessions simultaneously. The acceptable delay in responding to a chat message is much longer than that required for responding on a voice call.

On the other extreme, email is frequently not considered to be a very interactive channel, and many times an email is used when a single inquiry (which may be lengthy) is sent by a customer with the expectation receiving a single email response. Typically, if the customer expects that greater interaction is required, another channel type will be used. Frequently, it is not very practical to have an interactive conversation via email and other channels are used, if available. On there the other hand, providing a written explanation of a problem, which may be addressed via a single response, may be very well suited for using email.

Different agents will have different skill levels with respect to their multi-tasking ability, and different agents may be able to handle a voice call and different numbers of on-going email interactions. For example, an agent may be able to handle a voice call and several non-voice channel sessions, such as a chat session and two email sessions. The number of sessions may also be impacted on the nature of the information conveyed on each session. A session conveying basic information (such as operating hours of a store) may be easier for an agent to multi-task as opposed to conveying complex troubleshooting advice that is situation specific. Thus, the number and type of these different sessions need to be managed on a per-individual agent basis.

Further, an agent's ability will not necessarily be static during their shift or the same over different shifts. Some days, the voice calls may demand more concentration, leading to fewer non-voice communication sessions. It is possible that an agent may be focused on non-work issues, and be less effective in handling their regular number of communication sessions. This suggests that constant monitoring is required to adjust an agent's mix of communication sessions to ensure customer service is maintained. This adjustment may be required intra-shift and inter-shift.

Session Status

A communication session (or simply "session") refers to a logically related series of communications between an agent and a remote party (customer). Each session is associated with a particular channel type, and the communications during that session with use the same channel type. The communication session may be initiated either by the party or the agent (i.e., the session may be in an inbound or outbound communication relative to the agent in the contact center).

A voice communication session is usually clearly identified as to when it begins and ends. The beginning is marked by the answering of the voice call and the end is marked by terminating the voice call. The series of verbal exchanges during the call are inherently logically associated with the session because they occur on the same telephone call. A telephone call is an example of a connection-oriented communication, which clearly demarks the beginning and end of the connection and associates the communication on that channel with that connection.

A chat session is also usually clearly identified as to when it begins and ends, as the beginning is marked by the user typically interacting with a web site requesting a chat or accepting an invitation to begin a chat session. This typically involves opening a "chat window" on the user's computer. The agent will typically confirm when the session is completed, and closing the chat window definitely marks the end of the chat session. In some instances, the chat session may be considered as having ended even if the chat window has not been closed by the user. For example, if the user does not interact further with the chat window, a timeout may occur and the chat window is closed automatically. Although a chat session may use a connectionless underlying communication service, the chat session itself is typically considered a connection oriented session.

A SMS text session is an example of connectionless communication, where each information transfer is potentially 'stand-alone.' Typically, the user initiates the text to the contact center, but in some instances, the contact center may originate the SMS text. Delineating the beginning and ending of a session may be more complex if it is based on the contents of the texts. An initial SMS text can be considered as marking the beginning of a session, but there may be an issue as to whether an initial SMS text is establishing a new session versus continuing a prior communication session. Thus, it may not always be clear how/when an SMS text session ends. In various embodiments, a timer may be started which is reset upon receiving an SMS text such that if the timer expires, it signals the end of the session. In some instances the agent may indicate the end of the text session based on the contents exchanged in the text message. In another embodiment, a received SMS text may be treated as the beginning of a session and the response as ending the session. Thus, there are various ways for determining the end of a SMS text session.

Email is another example of connectionless communication. Typically, an initial email message results in a response, but there may not be necessarily a follow up email from the sender of the initial email. Similar to a text session, the email session may be viewed as beginning upon receipt of the first email, and ending upon sending the response. Thus, each initial message/response could be viewed as a stand-along email session. If the response is not sufficient to address the initiator's concerns, then the initiator may initiate another email message, and the two sessions could be concatenated and treated as one session.

A session that has started and has been deemed as not having ended, is called an "active session." An active session represents a dialogue that the agent is currently having with a customer. As noted above, it may not always be possible to accurately determine when a communication session has ended, but if it is deemed to not have ended, then it is deemed to be active. For voice calls, an active communication session is a voice call in the connected state. A communication session that is no longer active (e.g., is inactive) thus no longer exists. However, even if the communication is completed for a communication session, it may be useful to "retain" that communication session. This involves retraining the session for a "placeholder" in order to complete other tasks that originated because of that communication. In this way, another incoming communication session can be blocked until work is completed for the just terminated communication session. This will become apparent below, and such a communication session may be described as being in an "after call work" state.

The number and states of these communications sessions may be indicated to the agent via the multi-session graphical user interface ("MS-GUI"). This is presented to the agent on the display of a computer, used by the agent. Regardless of the how the beginning and end of a communication session for each channel is determined, the state of each session is indicated to the agent. There are a variety of ways a communication session may be indicated, including using different colors, font types/sizes/colors, icons, or symbols. In one embodiment, the beginning of a session may be signaled by changing font color of a text label and/or an icon color, and the ending of the session may be signaled by reverting the font of the text label/icon color back to its original state.

The indication of a session's status may have various states associated with it, and the indications of the session state may vary based on the type of communications channel involved. (For purposes herein, the communication sessions "status" is synonymous with a "state.") For example, a voice call may be considered to have started once the call is answered by the contact center, even if the call has not connected to a live agent. It is possible that such a call is being handled by an IVR or in a waiting queue for an agent. However, once that call is routed to the agent and waiting for the agent to engage in the call, the presence of the session needs to be communicated to the agent. In the case of the voice call, the call is considered "active." Once the call is ended, that communication session may be considered as terminated or inactive. Frequently, that communication session may be considered in the "after call work" state.

On the other hand, an incoming non-voice communications session may be routed or allocated to an agent, and the notification of the existence of the communication needs to be communicated to the agent. In this case, the communication session may have a "pending" or "awaiting review" status, which indicates the existence of a non-voice communication session, which has not been accepted or reviewed by the agent. This may reflect, e.g., a non-voice communication session pending a queue. Once the agent has accepted and/or reviewed the communication session, the status may be changed to another state, such as "accepted" or "active." A non-voice communication session that is terminated may be indicated as "terminated" and may be indicated as "inactive" or may be assigned to an "after call work" state. These status indicators may be indicated to the agent via appropriate text or colors via the MS-GUI. Although these labels of the session status are only exemplary, other states may be defined and indicated to the agent. The session state name indicated herein serve to illustrate the concepts of the technology herein, and are not designed to limit the use of other session status indicators.

Contact Center Overview—FIG. 1

Exemplary Contact center Architecture

FIG. 1 illustrates one embodiment of a contact center architecture 100 that may be used in accordance with the various technologies and concepts disclosed herein. The contact center shown in FIG. 1 may process voice calls and non-voice communications that are inbound-only, outbound-only, or a combination of both (sometimes referred to as a "blended" contact center). Although many aspects of contact center operation may be disclosed in the context of voice calls, the contact center may process other forms of communication such as, for example, facsimiles, emails, text messages, video calls, and chat messages.

Since the contact center may handle communications originating from a party, or initiated to a party, the term "party," "user", or "customer" without any further qualification, refers to a remote person associated with a communication processed by the contact center, where the communication is either received from or placed to the party. Thus, use of the term "calling party" or "originating party" refers to a party originating the communication to the contact center and is not intended to limit the concepts to only inbound voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: Ti trunks, SONET based fiber optic networks, ATM networks, etc. Various types of routers, switches, bridges, gateways, and other types of equipment may be involved in the processing of the calls.

Inbound voice calls may also originate from a mobile phone device 110c, such as a smart phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols, such as SIP or H.323 protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology, but could refer various VoIP communication channels.

Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of Internet Protocols ("IP") and facilities may be used to convey voice calls.

The term "telephone call" as used herein is generally synonymous with a "voice call" unless indicated otherwise. Further, the term "telephone call" may encompass a voice call using any form of currently available technology and/or originating from any type of device, such as a soft phone 110a, a conventional telephone 110b, a mobile phone 110c, or other device known in the art. The term "call" as used herein may encompass an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of the two-way connection.

In another example, a call may be put on hold, and a portion of the call may be referred to as a "call leg" existing between the caller and certain equipment, or between two pieces of equipment. A call may comprise a number of concatenated or joined call legs, which may involve various components at their end-points, as known to those skilled in the art. A call leg may also be unidirectional or bidirectional with respect to the ability to convey speech. In certain contexts, which will be made explicit, the call may encompass communications other than voice, for example, text, email, video chat, facsimile, etc. However, unless stated otherwise, a call is a voice call.

In various embodiments, inbound calls from calling parties to the contact center may be received at a communications handler 150, which could be, in one embodiment, an automatic call distributor ("ACD"). In particular embodiments, the communications handler 150 may be a specialized switch for receiving and routing inbound calls under various conditions. Further, the communications handler 150 may be embodied as a dedicated form of equipment readily available from various manufacturers, or the communications handler 150 may be a so-called "soft switch" comprising a suitable programming module executed by a processing device to perform the necessary specialized functions. The communications handler 150 may route an incoming call over contact center facilities 165 to phone device used by an available agent. Depending on the embodiment, the facilities 165 may be any suitable technology for conveying the call, including but not limited to a local area network ("LAN") 170, wide area network ("WAN"), ISDN, or conventional TDM circuits. In addition, the facilities 165 may be the same or different from the facilities used to transport the call to the communications handler 150.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, typically provided via a computer monitor. This is used to convey information to the agent about the calls, and the agent may interact with the communications handler using a mouse or other pointing device in conjunction with their computer display.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. The workstation may also communicate this login information to the communications handler. This allows the contact center (including the communications handler) to know which agents are available for handling calls. In particular embodiments, the communications handler 150 may also maintain data of an agent's skill level that may be used to route a specific call to the agent or group of agents having the same skill level. The communications handler may also know what type of channel and how channels the agent can handle. In particular instances, if a suitable agent is not available to handle a call, the communications handler 150 may queue the call for the next available agent. As can be expected, various algorithms may be employed to process calls in an efficient manner.

In various embodiments, the communications handler 150 may place a call (either an inbound or outbound call) in a queue if there are no suitable agents available, and/or it may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components, such as the data store 175, to retrieve or provide information for processing the call. In other configurations, the IVR may be used to only provide announcements.

Depending on the embodiment, the interaction between the various components shown may involve using a local area network ("LAN") 170. However, other configurations are possible, such as, but not limited to, using a wide area network, wireless network, router, bridge, direct point-to-point links, etc. Thus, in lieu of facility 165 for conveying audio to the agents, the facilities associated with the LAN 170 may be used.

In addition to receiving inbound communications, including, for example, voice calls, emails, text messages, and facsimiles, the contact center may also originate communications to a called party, referred to herein as "outbound" communications. In some embodiments, the communications handler 150 may be a dialer, such as a predictive dialer, that originates outbound calls at a rate designed to meet various criteria. The predictive dialer may then connect an agent at a workstation with the outbound call via a call leg after the remote party answers. Similar to the other components within the contact center architecture 100, depending on the embodiment, the dialer may comprise one or more software modules executing on a processing device hardware platform.

In various embodiments, the communications handler 150 is typically configured to dial a list of telephone numbers to initiate outbound calls. Thus, in some embodiments, the communications handler 150 may include functionality for originating calls, and if so, this functionality may be embodied as a private automatic branch exchange ("PBX" or "PABX"). Further, in other embodiments, the communications handler 150 may directly interface with voice trunks using facilities 116c, 116d, and 116e to the PSTN 115 and/or Internet providers 123a, 123b for originating calls. After the calls are originated, a transfer operation by the communications handler 150 may connect the call with an agent or to a queue, or in some instances the IVR. In various embodiments, the communications handler 150 may make use of one or more algorithms to determine how and when to dial a list of numbers so as to minimize the likelihood of a called party being placed in a queue while maintaining target agent utilization.

The contact center may also receive non-voice communications, such as email messages. The email messages may be sent by a user using, e.g., a smart phone 110c or a computer 105, which are conveyed by the Internet 123a, 123b to an email server 135 in the contact center. The email center may provide the emails to the communications handler 150, which then queues the email message to the appropriate agent. Similarly, the contact center may also receive SMS or text message. The text messages may be sent by the user using a smart phone 110c. The text may be sent by the MSP 112 over the Internet 123b, which are received by an SMS gateway server 140. Once received, the texts are provided via the LAN 170 to the communications handler 150 where the SMS text is then queued for the appropriate agent. With respect to chats sessions, the customer may access a web site in a chat server 145 using a computer 105, and requesting a chat session. This establishes the chat session using a chat server 145, which communicates the messages to the communications handler 150, which queues the appropriate agent for the chat session.

Those skilled in the art will recognize that other architecture alternatives exist for accomplishing the exchange of chat, text, and email messages. For example, any of the email servers 135, SMS gateway 140, or chat server 145 could be integrated into the communications handler 150. Other embodiments may require interaction with various servers in various service providers. Further, other types of non-voice messages could be exchanged, and may involve additional elements, such as fax servers, social media web sites, etc.

As will be discussed in greater detail, an incoming voice communication may be received directly at the communications handler 150, or at one of the servers/gateways if non-voice. The server/gateway will then inform the communications handler 150 of the particular communication session. The communications handler 150 will then determine which agent is authorized and available to handle the communication, and thereafter appropriately coordinate any response message. In one embodiment, the communications handler 150 uses a common scheme for allocating a communication session to an agent. In other embodiments, different schemes could be used. For example, incoming voice calls could be allocated to agents on a round-robin basis, but incoming emails could be allocated on a least-number-served basis, which chat sessions could be allocated to the first available agent, based on seniority.

The administrator computer 157 may be used by the administrator to impact the agent authorization and selection procedures, which may involve configuring the various servers/gateways and the communications handler 150. The administrator may have access to various data structures (as discussed herein) for defining what types of communication channels an agent may handle and how many. Thus, the administrator has the ability to adjust the 'mix' of channel types that agents may handle. This can be done for various reasons, including to account for day-to-day variations in the agent's work ability. For example, an agent with a sore throat may be able to handle non-voice communications, but may request to not handle any voice calls for a shift.

Although a number of the above components may be referred to as a "server," each may be also referred to in the art as a "computing device," "processing system", "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the servers identified above actually be located or controlled by a contact center operator.

In addition, depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Those skilled in art will recognize FIG. 1 represents one possible configuration of a contact center architecture 100, and that variations are possible with respect to the protocols, facilities, components, technologies, and equipment used. For example, various algorithms and queuing arrangements may be defined to efficiently process and/or place calls.

MS-GUI Overview

Figure 2:
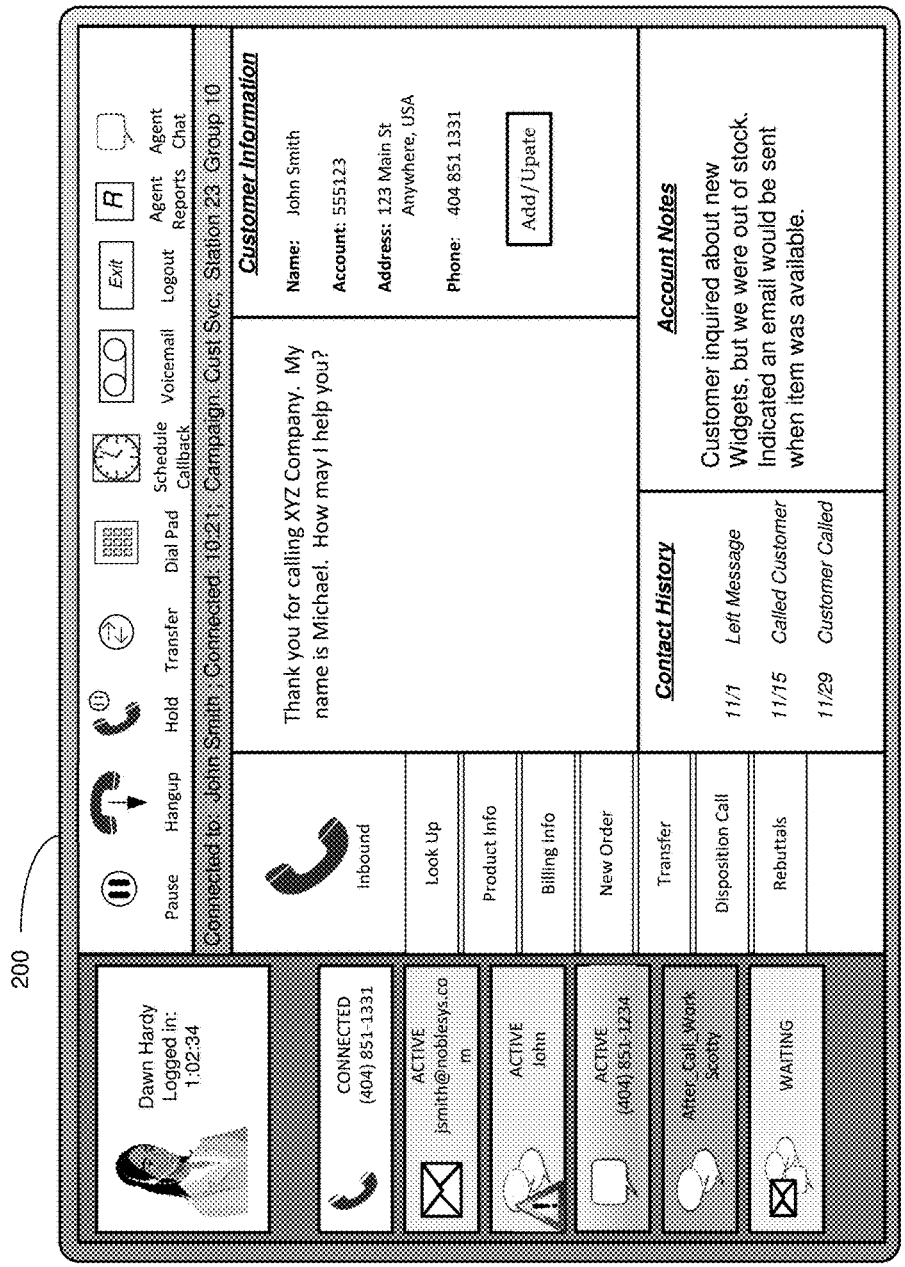

FIG. 2 illustrates one embodiment of the MS-GUI 200. This example illustrates one embodiment of a screen display that an agent may see. The MS-GUI 200 involves a number of communications sessions and the agent is present with high level information about the different communication sessions as well as detailed information about a particular currently selected communication session. In this case, the currently select communication session is a voice-oriented communication session. Although there are various icons, functions, and information presented, the information is carefully organized to facilitate agent review and further facilitates agent review of information about other pending communication sessions. Each of the portions of the MS-GUI will be discussed at a high level, and then examples of various embodiments are shown.

Figure 3:
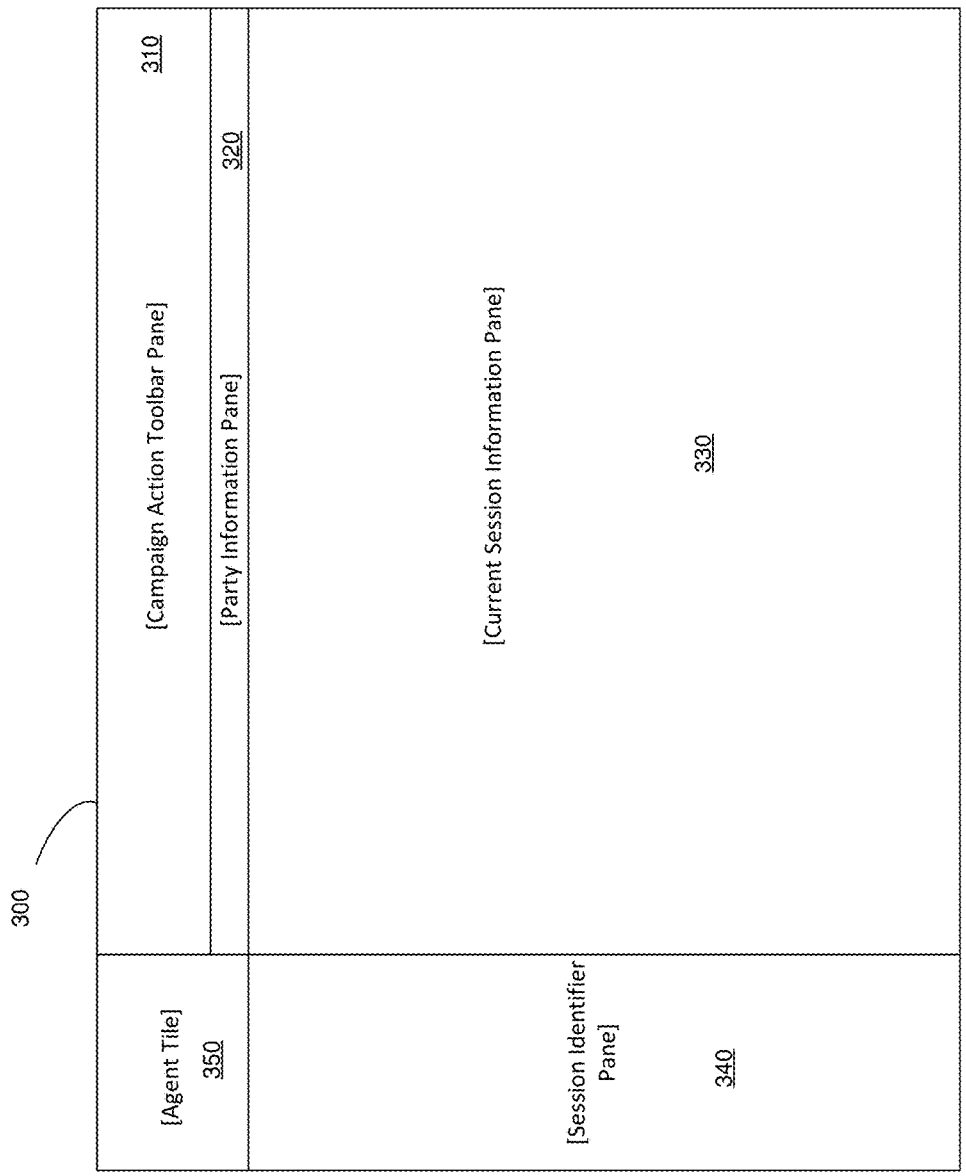
FIG. 3 illustrates one embodiment of the various panes of the graphical users interface display screen that are presented to the agent.

FIG. 3 shows the main portions of the MS-GUI 300 without presentation of the various icons and text information. This format emphasizes and delineates various portions of the screen, called "panes." Each pane is a self-contained set of information that is displayed as a unit and has a distinct purpose, though it may be related to other panes. The session identifier pane 340 comprises that portion of the MS-GUI that contains information about the various communication sessions handled by the agent, but with limited information about each session. The session identifier pane 340 displays information about how many communications session the agent may handle at a given time, what channel type of each communication sessions may be, status or state information about each communication session, and potentially information delineating what party is involved on each communication session. In summary, the session identifier pane 340 provides a comprehensive summary of the various communication sessions, attributes, and status information. In one embodiment, this includes pending and potential communication sessions that the agent may be involved in. The session identifier pane 340 also allows the agent to select the communications session the agent desires to currently interact with. Thus, the session identifier pane 340 allows the agent to control which session is currently selected, which impacts other portions of the screen that the agent is seeing, namely the current session information pane 330.

The current session information pane 330 displays information pertinent to the current communication session. Typically, the current session is the communication session that is selected by the agent, though in some cases the current session information pane may be automatically selected for the agent based on an event (e.g., an incoming voice call). The current session information pane ("CSIP") presents various information related to, and/or functions that the agent can invoke that are associated with the currently selected communication session. The current session information pane 330 is structured so as to be largely dependent on the type of channel of the corresponding selected communication session. That is, if the current communication session is a voice channel, then the current session information pane 330 has a first format structured for voice calls, whereas if the current communication session is a chat channel, then the current session information pane has a different format and structure corresponding for chat channels. In some embodiments, there may be different structures of the CSIP if the channels are associated with different campaigns.

The party information pane 320 provides a convenient pane for the agent to review information about the party involved in the current communication session. This pane may also include information about the campaign currently associated with the current communication session selected. It contents is typically is altered based on the particular selected communications session. In one embodiment, the structure and format is the same across different channel types, though the values may be altered based on the campaign.

The campaign action toolbar pane 310 displays icons for invoking functions associated with the current campaign. These functions may be applicable to the current campaign, which is determined by the currently selected communication session. Thus, the contents of the campaign action toolbar pane 310 may vary based on the selected communication session, as different communication sessions may be linked to different campaigns. In various embodiments, the structure of the campaign action toolbar may be very similar for different campaigns and/or channel types.

The agent tile 350 contains information about the agent that is currently logged into the communications handler system. The agent tile may include a name, photo/image associated with the agent, and other agent-specific related information, such as their current shift statistics, key performance indicators, etc. At least portions of the agent tile typically static, i.e., the photo/name do not change based on the particular communication session or campaign currently selected. However, other values, such as performance parameters, may be specific to the currently selected communication session or campaign.

Figure 4:
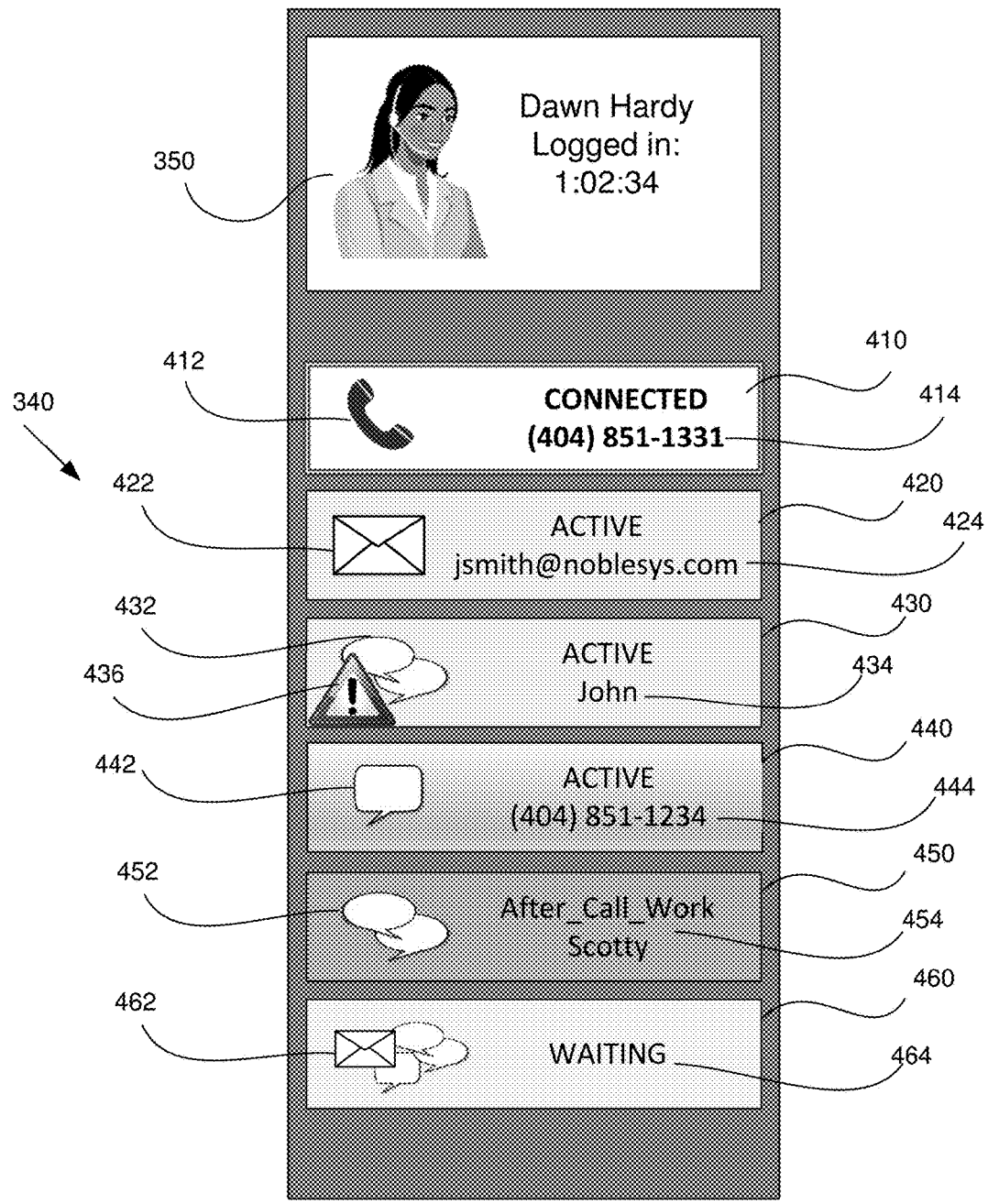
FIG. 4. illustrates one embodiment of a graphic user interface display screen that includes an agent tile and various communication session identifiers in a current session identifier pane.

FIG. 4 examines selection portions of the agent tile 350 and the session identifier pane 340 in greater detail. The agent tile 350 may be used to indicate the agent currently logged in. A photo or caricature may be included along with a name, nickname, agent number, or other identifier. Other information may be included, such as time since the agent has logged in at the beginning of their shift. Typically, the name/photo information is static, and does not change based on the selected communication session. Other portions, such as log-in time, performance indicators, etc., may be dynamically determined.

The session identifier pane 340 shows various communication session identifiers ("CSI") 410, 420, 430, 440, 450, and 460. (Each of these are also sometime simply called a "Session Identifier".) Each CSI represents an active session or a potentially active communication session. Thus, there are six CSIs shown in this embodiment. This indicates that this agent may have up to six simultaneous communication sessions active. Further, this example reflects the agent may have only one voice communication session and five non-voice communication sessions active. In many embodiments, the maximum number of simultaneous communications sessions may be limited to a lower number. However, the configuration represented in FIG. 4 is useful to represent some of the various combinations that may be possible.

Each CSI will also include an indication of the channel type associated with the communication session. The corresponding channel type may be indicated using an icon, text, color, or combination thereof. In addition, each CSI will typically include an indication associated with the status of the communication session. This also may be indicated using an icon, text, color, or combination thereof.

In this embodiment the voice CSI 410 shows a status indicator ("Connected") via text and a telephone number 414 that is associated with this communication session. A telephone icon 412 provides a visual indicator of the type of communication session, which in this case is voice. In some embodiments, the telephone icon 412 may have different positions/shapes to represent different status, e.g., it can have a first position for an active call and a second position representing a call on hold. In this example, the voice CSI 410 is shown as selected. A particular CSI that is selected may be highlighted or differentiated in some manner, so as to indicate to the agent which CSI is presently selected. In one embodiment, the agent can select a CSI using a mouse, pointing device, keyboard, touch screen, or other such means. Selecting another CSI automatically results in de-selecting the current CSI. In some embodiments only the agent can manually alter the CSI selected, whereas in other embodiments, an event may result in selecting a CSI on behalf of the agent.

The CSI may have a background color that may be coded to reflect status information. The status information can also be indicated via text. For example, the voice CSI 410 indicates the status as "CONNECTED" and this may also be reflected via a color or shading, pattern, or other fill pattern. There may be different shades/patterns of a color used to represent different sub-states. (The colors are not shown in FIG. 4 because of the limitations of depicting colors in U.S. patents, and instead are represented via grayscale.) For example, a selected CSI that is "CONNECTED" may be indicated in bright green, which reflects an active voice call. If it is a connected voice call that is placed on "hold", then it may have a different shade of green to reflect a connected voice call on hold.

The CSI may also reflect party information, which may be performed via a telephone number 414 as shown, or a party's name. The indication of a party's identifier is useful when there are two communication sessions of the same channel type. Typically, however, an agent will have only one voice call at a time. However, in certain circumstances, the agent may be authorized to have two voice calls, and if so, the telephone number is a useful indicator to distinguish them.

The next CSI shown is an email CSI 420, which is identified in part by the presence of an email icon 422. This CSI is characterized by a status indicator comprising text indicating it is "ACTIVE" and an email address 424 of the party involved. Because email communications is different from voice in various ways, the status indicator shown here states the communication session is "active" as opposed to "connected." The "active" status for non-voice communication sessions may reflect that the initial non-voice communications message has been initially reviewed by the agent and that communications are still ongoing. Again, this CSI may be colored in bright green to reflect that it is active and/or selected. If the email message has been queued up for the agent, but not yet reviewed, then the status text may have indicated another value, such as "PENDING" or "WAITING." An email address 424 is useful to identify one email session from another.

The next CSI shown is the chat CSI 430, which is identified in part by the presence of the chat bubbles icon 432. The chat bubbles icon 432 represents the interactive dialogue nature of chat messages, but other symbols may be used to represent this channel type. In this case, the chat communication session is also marked as "ACTIVE", indicating that the chat is in progress. A warning symbol 436 may be overlaid on the CSI to inform the agent that an agent response has not been provided in an expected time frame. A self-reported name of the customer ("John" 434) may be indicated, but in other embodiments, a number may be used. This can be useful to distinguish one chat session from another, though it is possible by coincidence that names may be duplicative across multiple chat sessions.

Recall that a voice call demands a high degree of agent interaction, otherwise the other party will promptly inform the agent of a lack of attention. A non-voice communication, however, does not necessarily require the same level of agent real-time attention. It is not unusual for a chat message may go unanswered for three, ten, or twenty seconds. However, after say, e.g., 60 or 90 seconds, the party may be annoyed at the lack of agent response. To remind the agent to provide a timely response, an agent response timer may be created that is started in response to receiving a party's chat message. The agent response timer is canceled upon the agent sending a response. Otherwise, the expiry of the agent response timer results in displaying the warning symbol 436 to the agent, reminding the agent to respond to the chat request. This serves to draw the agent's attention to this communication session. It can be appreciated that different agent response timer values may be created for different non-voice channels. For example, an email message would likely have a much longer value. A response to an email may be expected without several hours instead of seconds or minutes. This reflects the different level of responsiveness associated with different non-voice communication channels. It is expected that contact center operators will have policies as to how long a non-voice communication session may exist before a warning will be issued. These policies could vary based on customer, campaign, etc.

The chat CSI 430 may indicate a customer name 434 as shown, but the nature of chat is that the user voluntarily provides the name information. Unlike a phone call or text message, which is associated with a telephone number, or an email message which is associated with an email address, a chat is initiated by the party. Any identifier is likely to be based on a name provided by the party. However, in other embodiments, an arbitrary unique system-generated number could be used to identify this chat session from another chat session.

The next CSI shown is the text CSI 440, which is characterized by the text icon 442. The text CSI 440 has an "ACTIVE" status, and the corresponding telephone number is shown. As with an email communications session, the "ACTIVE" status may represent that a text has been received, and that a response text needs to be sent. The status may change to "AFTER CALL WORK" upon the response being sent or the agent indicating the session is completed.

Similarly, a text which has been received, but not yet reviewed, may be indicated as a "PENDING" status.

The next CSI shown is another chat CSI 450, as evidenced by the chat icon 452. However, this CSI reflects that the communication session is in an "AFTER CALL WORK" state 454. This term ("after call work") originated in contact centers in regard to voice calls, and refers to the work an agent carries out after the voice call has ended, but before the next call is handled. Thus, this status reflects that the "call" (or more accurately "session") has completed, and the agent is responding to various action items generated as a result of the session. When a communication session is labeled as "after-call-work," the system knows not to offer another communication session with the agent since they are engaged in work related to the prior communication session. Even though the actual communications may be completed with the party, the work associated with the communications session has not been completed. Thus, in a sense, the communication session could be said to still exist, even though the communication itself has ended. The agent should not be considered as being available for handling another communications until the after call work is completed. When the agent has completed the after-call-work, the agent can then disposition the communications session, and as a result the CSI will change to a "waiting" state. Disposition the communication session is analogous to disposition a call, which involves entering a code describing an outcome of the session.

The next CSI is a generic non-voice communication CSI icon 460, which in this embodiment is characterized by the non-voice set of icons 462 shown to be in a "WAITING" status. This hybrid icon 462 comprises the email icon, the chat icon, and the text icon combined into one icon. This waiting CSI 460 is a placeholder of sorts, for a yet-to-be-received communications session (e.g., waiting to arrive). In essence, this CSI indicates that the agent may expect to receive a non-voice communication session that could be in the form of a chat, email, or text session. If the agent could only handle a maximum of five communication sessions (which would be associated with icons 410, 420, 430, 440, and 450), then this CSI would not appear in the pane (since the other five are occupied with a session). Similarly, if the agent could only handle one email session (as currently reflected in CSI 420), then in one embodiment this CSI would only show the text and chat icons. Thus, the icons displayed correspond to what are the allowable channel types. This CSI may have a different color to indicate that no associated communication session is pending or active.

Only one CSI may be selected at a time, and once selected, the CSI may be reflected in a distinctive manner on the MS-GUI screen. In this embodiment, the voice CSI 410 is selected as reflected by the text shown in bold font and a different border. If another CSI is selected, the CSI 410 would revert to a normal font and border (or whatever prior format was used prior to selecting it) and the newly selected CSI would then have the augmented font type and border. The selection of a CSI alters (at least) the information presented to the agent in the session information pane 330. While the selection of a non-voice CSI will alter the non-voice communication session the agent is interacting with, this does not alter the communication status of a voice channel. That is, the selection of a non-voice CSI over a voice CSI will not impact the ability of the user to interact with the party using the phone device, but it will change the current session information pane displayed to the agent. To interrupt the voice communications, a hold function on the campaign action toolbar could be invoked.

The CSIs shown in FIG. 4 are represented as a vertical column of indicators. Other arrangements may include a horizontal arrangement of indicators. In one such variations, a horizontal series of "tabs", well known in the field of web design, may be displayed and selected by the agent to identify a particular communication session. Other arrangements to indicate the various CSIs may include other graphical icons, such as radio buttons, checkboxes, etc.

Session Communication States

The term "Session Communication State" (or "Session Communication Status") refers to the current state/status of a communication session. As mentioned above, the current status may be reflected using a text label on the CSI. The number of states defined for a given implementation may vary, as the level of granularity required may vary. The state information may be communicated to the agent, so as to inform the agent of the current state of a session, and can also be used to gather performance statistics for an agent. The communication session states depend on the particular channel type.

For example, a voice communication session may have a "connected" state, reflecting that the voice call is active, and there is a party on the call. There may be value in a further level of granularity and indicating to the agent that the call is a "hold" state. This reflects an active call that is placed on hold. In some embodiment, this could be defined as a sub-state of the "connected state" or defined as a separate state—e.g., a "connected-but on hold" state. Similarly, a separate state may be tracked or indicated when the agent is on a call but speaking with the party. This could be a "connected—speaking" state. This would allow tracking how much time the agent is on hold during a voice call as opposed to speaking with the party.

When the agent completes the call and the call ends, the communication session may be in an "after-call-work" state, which indicates that although the communication session may be over, the session still is treated as continuing in order for the agent to complete various tasks originating from the call. Once the agent completes the work associated with the call, and dispositions the session, the communication session may be in a "waiting" state. This indicates that another incoming voice call may be able to be handled.

As for the non-voice communication session, when an incoming communication is received, that communication session indicator may transition from a "waiting" state to an "active" state. Alternatively, if the agent has not yet reviewed the communication, the state may be a "pending" or "awaiting review" state. This indicates to the agent that they have not yet initially reviewed the communication. If so, then after the agent initially reviews the initial communication, the state may then change to active.

In some embodiments, a timer could be identified for a non-voice communication session. For example, a chat session may have a timer indicating how long since the agent has reviewed the last incoming communication. For chat sessions, there may be a goal of having the agent respond to a chat message within a time limit (e.g., 1 minute). If this timer expires, then the communication session indicator could reflect an "Attention Needed" state. Determining when a non-voice communication session has terminated may be determined by the agent, based on the context of the communication. Or, termination may be presumed once a response is sent. Once the agent dispositions the communication session, the communication session indicator may revert to a "waiting" state. This indicates that another incoming communication is able to be handled.

There are other state indicators that may be useful. For example, an agent may be required to temporarily focus on a task other than handling communication sessions. For example, an agent may complete all pending communications and be asked to have a meeting with their supervisor. The agent can temporarily suspend or pause themselves from receiving calls while they have their meeting. If so, the communication sessions may be placed in a "paused" state, which indicates the agent is not available to receive any incoming communication sessions. This can be invoked even when the agent is involved in a communication session, so as to allow the agent to "clear out" their communication sessions so as to then meet with their supervisor when all the communication sessions have ended. In addition, the agent may log out from handling communication sessions, which may be viewed as a permanent type of "pause." This may be reflected by the communication session indicators showing a "de-assigned" or "logged-out" label.

Current Session Information Pane

The information presented to the agent in the current session information pane 330 depends on the currently selected CSI. The structure and format may be dependent on the channel type and/or campaign for that channel type. In some embodiments, the structure and format of the current session information pane can be defined by the contact center administrator, while in other embodiments, the structure and format may be fixed for each channel type. Thus, the particular information presented, the functions available, sub-panes associated with a particular session information pane may be different from what is shown. Thus, as expected, in FIG. 2 the current session information pane reflects that the current selected communication session indicator involves a voice channel. There would also be a CSIP corresponding to a chat communications session, another for a text communication session, and still yet, another CSIP for an email communication session. If there are other communication sessions defined (e.g., a fax communication session or particular social media communication session), then there would be corresponding current session information panes defined for those.

Figure 5:
FIG. 5 illustrates one embodiment of a voice-oriented current session information pane.

FIG. 5 shows one embodiment of the current session information pane 500 corresponding to selection of the voice CSI. For simplicity, this is referred to as the "voice session information pane" ("VSIP"). The VSIP 500 comprises several sub-panes, and the particular design and layout for the VSIP may vary in different embodiments. In this embodiment there is a session communication icon 532 to remind the agent the nature of the channel type involved with the communication session. In this embodiment, the icon is that of a telephone, signifying it is a voice communication session.

Below the telephone icon 532 are a series of functions 534a-534g, which can be defined as appropriate for the campaign. In this example, various functions are provided to assist the agent in servicing voice calls for this particular campaign. The "look up" function 534a allows the agent to request and retrieve information from a database about specified information, such as an account. The "product info" function 534b allows the agent to retrieve product related information. Next, the "billing info" function 534c allows the agent to retrieve billing information about certain information. The "new order" function 534d allows the agent to indicate that a new order is to be placed. The "transfer" function 534e allows the agent to transfer the call. The "disposition" function 534i allows the agent to disposition the call, which allows the agent to indicate certain pre-defined aspects of the call. Dispositioning the call may involve selecting a code that indicates the resolution of the communication. The code may reflect that the call reached an answering machine, the right party was not home, the customer was satisfied with the product they ordered, etc. Finally, the "rebuttal" function 534g allows the agent to retrieve information to rebut a point made by a party. These functions may be different or tailored for a particular application. Invocation of a particular function may open a corresponding window with further information and related functions. Further, the invocation of each function may result in launching a query over an API, accessing a customer relationship management system, etc.

The main information sub-pane 505 provides information to the agent for this particular voice call. In this example, the campaign may be for customer service, where callers dial a number to have their questions answered. The main information sub-pane 505 may provide scripting information for the agent. The contact history sub-pane 520 may provide prior contact summary information for the agent. The account notes sub-pane 515 allows the agent to write and review notes related to this account. Finally, the customer information sub-pane 510 provides summary information regarding the customer, which may be determined by examining the calling party number to retrieve account information.

Various structures and formats may be defined depending on the particular application and contact center needs. The VSIP provides the appropriate resources, functions, and information that an agent may need while servicing voice calls.

Figure 6:
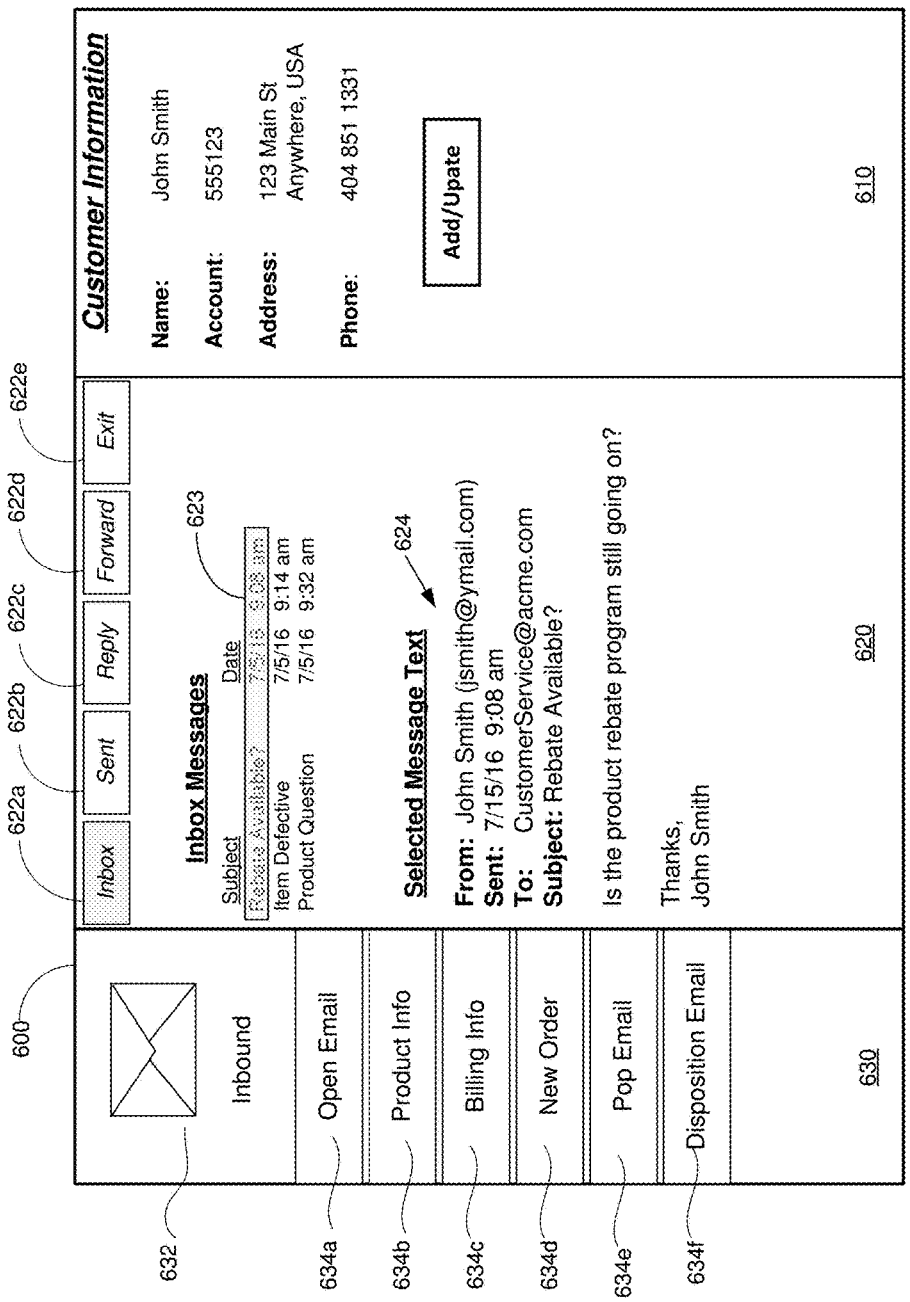
FIG. 6 illustrates one embodiment of an email-oriented current session information pane.

FIG. 6 shows an embodiment of an email current session information pane 600. Each of these session information panes are sized so as to replace any other CSIP upon selection of the appropriate communication session indicator. The email CSIP also includes a session communication icon 632 to remind the agent of the channel type associated with the selected communication session. The various functions located below 634a-634i are defined in the context of the campaign and the communication session type. The "open email" function 634a allows the agent to open the selected email message 623 from the inbox. The "product info" function 634b allows the agent to retrieve production information. The "billing" function 634c allows the agent to retrieve billing information for that account. The "new order" function 634d allows the agent to indicate a new order is to be placed. The "pop email" function 634e allows the agent to update the email folders. Finally, the "disposition email" function 634f allows the agent to disposition an email exchange.

The main sub-pane 620 allows the agent to review their inbox, select a message to review, and view the message itself. In this example, the agent has selected an email message 623 and the message text 624 is shown in a conventional manner. Various function keys 622a-622e may be provided to the agent to perform various email related operations. The "inbox" function 622a allows the agent to review incoming email messages. The "sent" function 622b allows the agent to review previously sent email messages. The "reply" function 622c allows the agent to reply to a selected message, and the "forward" function 622d allows the agent to forward the email. The "exit" function 622e allows the agent to exit the email application.

Another sub-pane shown is the customer information sub-pane 610. This shows customer related information that may be useful or convenient for the agent when dealing with a particular customer. Typically, the system may be able to map the email address to an account in order to retrieve the appropriate customer information.

Figure 7:
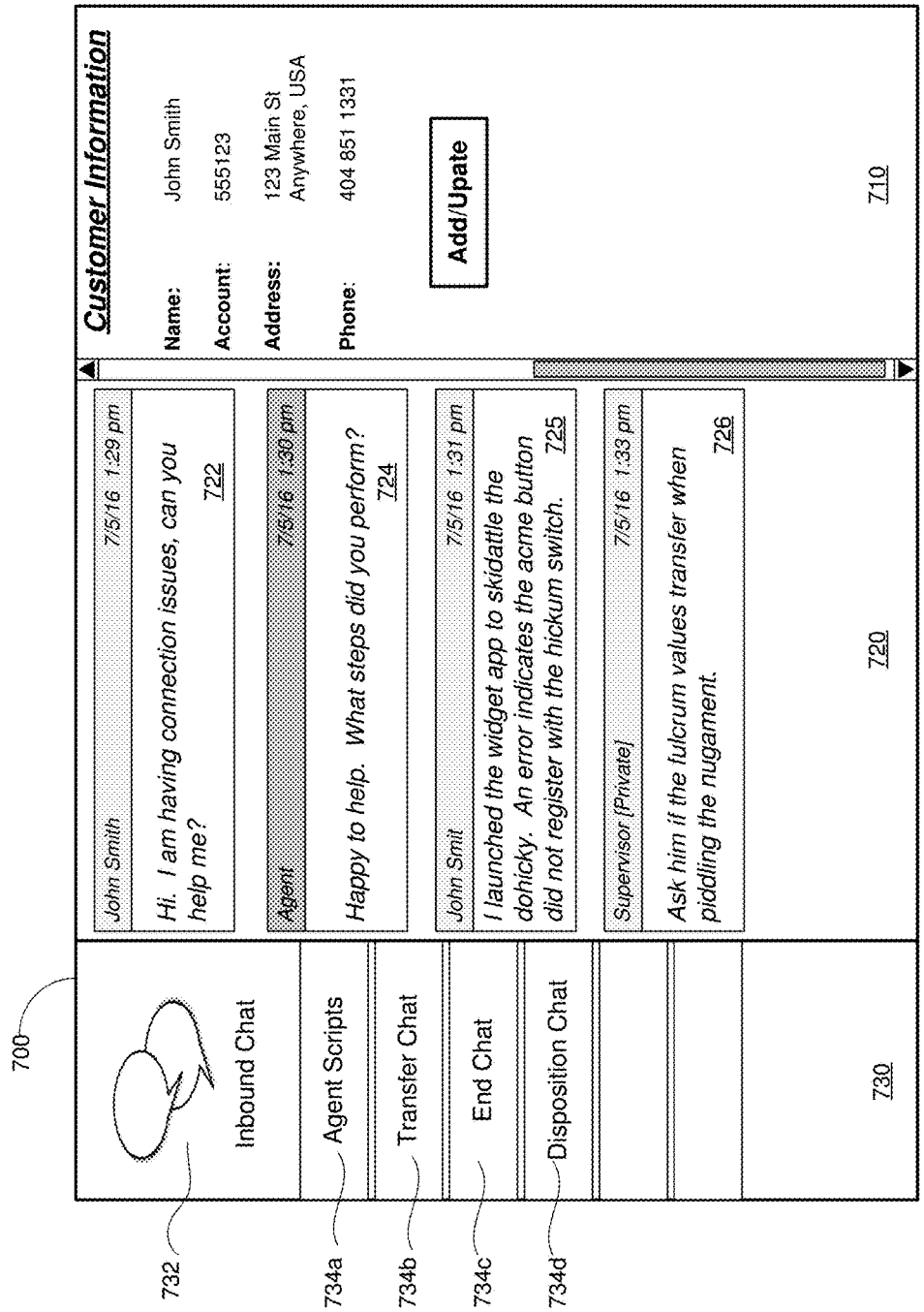
FIG. 7 illustrates one embodiment of a chat-oriented current session information pane.

FIG. 7 illustrates the chat session information pane 700, which again comprises a chat icon 732 in the upper left corner to remind the agent of the channel type of the selected communication session. The functions below 734a-734d allow the agent to invoke functions commonly used with this communication session type. The "agent scripts" function 734a allows the agent to retrieve a library of various agent scripts which may be used in a response or edited to form a response. For example, if the customer asks a question about the company's return policy, a pre-canned response could be selected and sent to the customer. The next function, "transfer chat" 734b allows the agent to transfer the chat to another individual to assist or takeover the chat. The "end chat" function 734c allows the agent to indicate that the chat session has ended. Finally, the "disposition chat" function 734d allows the agent to disposition the session as needed.

The main sub-pane 720 contains the current chat dialogue, and various formats can be used to represent the dialog. In this embodiment, various chat boxes 722, 724, 725, and 726 represent the dialogue. The first chat box 722 represents the opening chat from the customer. The customer's name (to the extent it is provided) is shown. The next chat box 724 shows the agent's response. It may have a different color to allow the agent to quickly identify it from the customer's chat. Next, a response chat box 725 is shown. Finally, a supervisor's chant box 726 is shown, which is visible to the agent, but not to the customer. As additional chat messages are sent/received, the messages may scroll up. If the number of chat boxes exceeds what can be presented to the agent, a scroll bar allows the agent to review the prior chat messages.

Finally, a customer information sub-pane 710 is shown, but in some instances the system may not be able to match a customer's account information with the name provided by the user. If the name does match, then account information can be retrieved and displayed. In various embodiments, the agent may ask the party for account information and can enter that to find the customer's account information.

Other Panes

The campaign action toolbar pane 310 of FIG. 3 contains icons related to the campaign associated with the selected communication session. Examples of typical icons are shown in FIG. 2. These include icons representing functions for controlling a voice call, performing common communication functions (such as scheduling a callback or checking voice mail). Other functions include administrative functions, such as logging out from the system, generating a report, initiating a chat with another agent or supervisor, etc. It is a matter of design choice as to whether some of the functions could be relocated, duplicated, or incorporated to a particular session information pane or are solely located at the campaign action bar pane 310.

The other pane shown in FIG. 3 is the party information pane 320, which contains information about the party involved in the communication session, aspects of that communication session, the corresponding campaign, agent station number, etc. In various embodiments, this information may have the same structure across various communication session types, or may be tailored for a particular communication session. Reviewing this pane is useful if there are, e.g., two communication sessions of the same channel type, and the agent may rely on reviewing the customer's name in order to distinguish which communication session they have currently selected.

Administrative View of Agent Communication Sessions

The communication session indicators shown in FIG. 4 provides the agent with a summary of the available communication sessions and an indication of which session is selected. This layout can be utilized for an administrator or supervisor who is in charge of managing a group of agents. For such applications, the administrator may have a set of summary information as to the agents' status. In accordance with the GUI structure for the agents, the administrator may have a screen interface showing various agents and their corresponding communication session status. One such embodiment is shown in FIG. 8.

Figure 8:
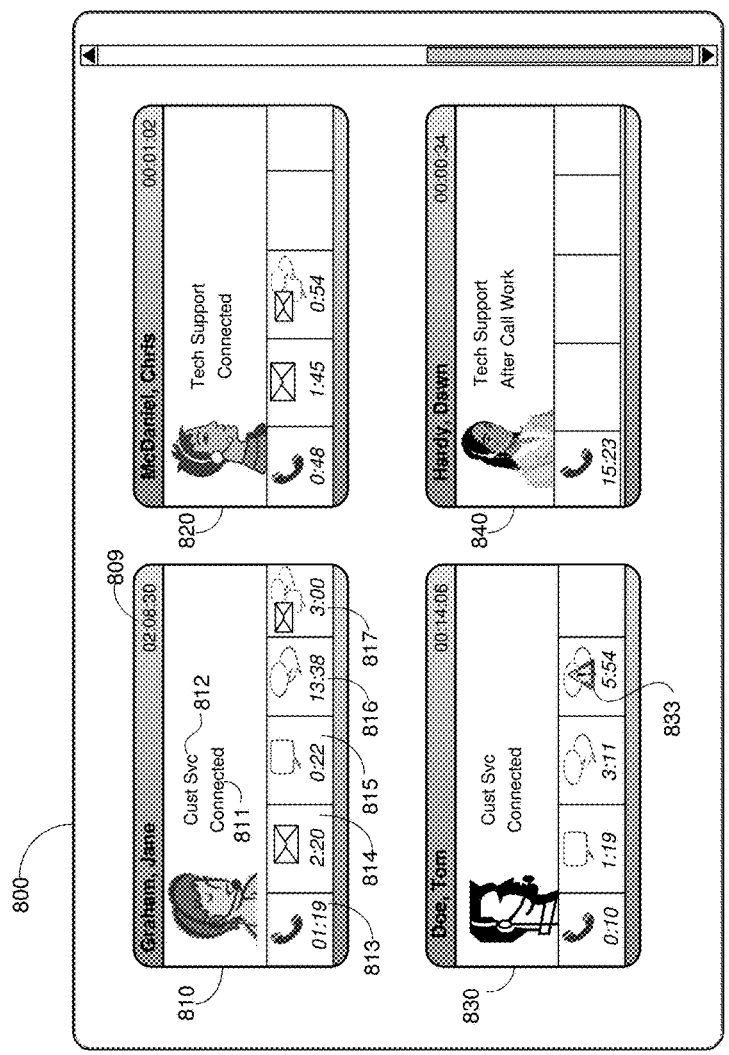
FIG. 8 illustrates one embodiment of a supervisor's graphical user interface display screen with another embodiment of various agent tiles.

Turning to FIG. 8, the administrator screen image 800 shows a series of agent tiles 810, 820, 830, and 840. This may be a partial view of the agents currently working in the contact center that that administrator can view. A scroll bar may allow the supervisor to scroll up or down (or sideways) to view additional agents not shown on the screen. Each agent tile may comprise a photo or caricature of the agent with their name indicated. Further, a time 809 that the agent has been on a call or on their current shift may be indicated. Information may be displayed indicating a particular group or function associated with that agent, such as customer service indicator 812, and a status indicator 811 shown, which pertains to the status of their currently selected communications session.

Turning to one of the agent tiles 810, a series of communication session identifiers 813, 814, 815, 816, and 817 are shown. The voice communication CSI 813 is identified by the telephone icon, and a time of that call duration. The email CSI 814 is identified by the email icon, and a time either representing the time since the last email was reviewed or the duration of the entire communication session since the beginning of the session. Similarly, the text CSI 815 includes a text icon and a time, as does the chat CSI with its chat icons. Finally, the last CSI 817 shows the combination of text/chat/email icons, which indicates that the agent may be able to handle another incoming non-voice communication session.

In many embodiments, all agents will be configured to handle at least one voice call. Some agents, such as shown in agent tile 840, will be configured to only handle one voice call. Until the agent is experienced and has demonstrated skill in multi-tasking communications session, only one communication session may be allowed.

In the case with another agent tile 830, a warning icon 833 is shown to the administrator. This may signify to the administrator that the agent has not responded within a certain time window on this communication session. Or, the warning may represent a degradation of that agent's performance parameters, suggesting the agent may be overwhelmed. The administrator may receive a visual indication or a text indication that this particular agent is not addressing a communication session in a timely manner. If this occurs frequently enough, the administrator may choose to configure the agent to handle a lower number of simultaneous communication sessions. The warning symbol may be symptomatic of the agent being unable to handle so many communication sessions, and may reflect poorly on the customer service that the agent is providing to customers.

Functional Process Flows

Figure 9:
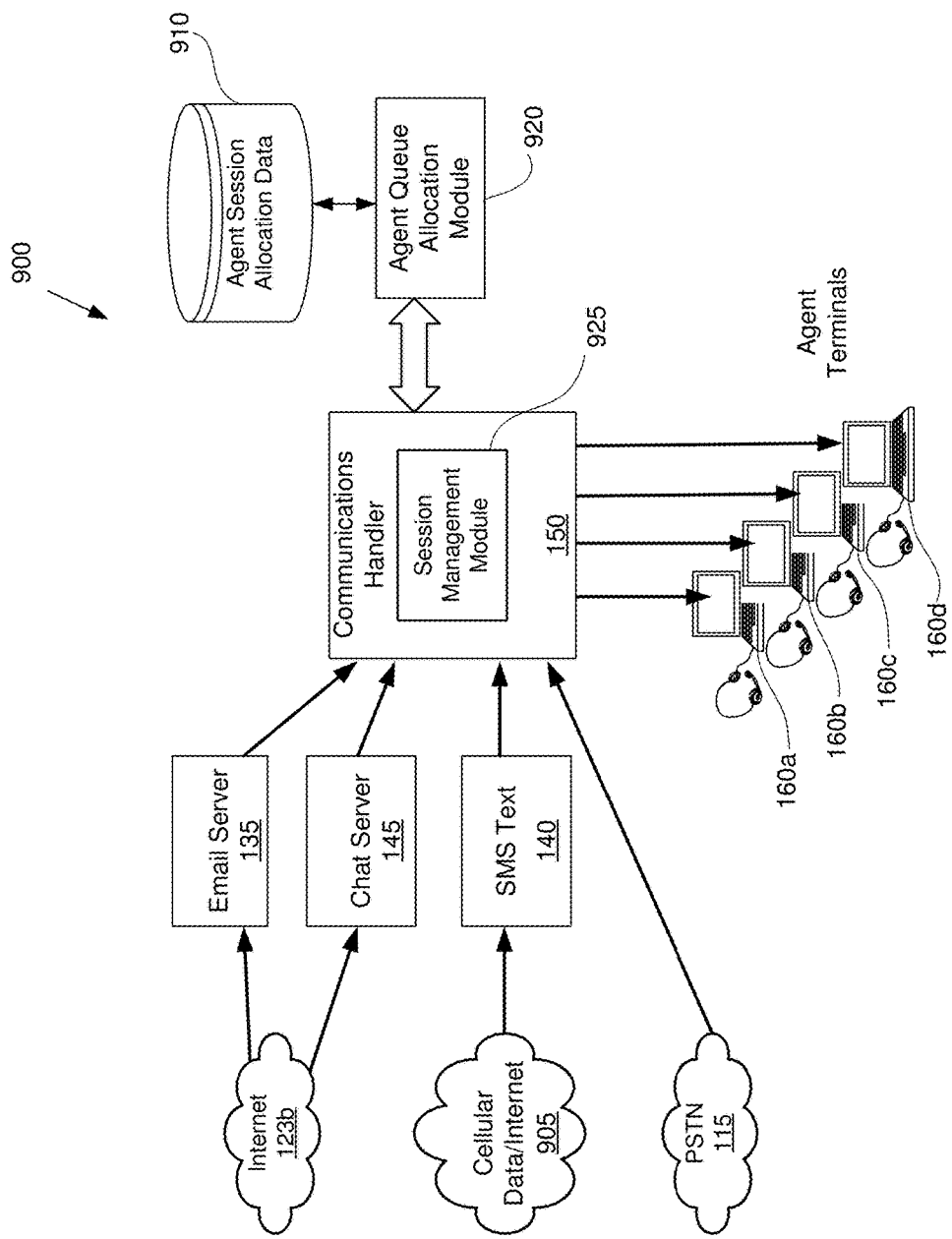
FIG. 9 illustrates one embodiment of a functional architecture of components that may be involved in handling multiple agent communication sessions.

FIG. 9 shows a functional process flow showing in part how a communication session is established and sent to an agent. Although a communication session could be an inbound or outbound communication with respect to the contact center, the following example is illustrated in the context of inbound communications. A customer originates either a voice or non-voice communication session. If voice, then call may be received at the PSTN 115 and then offered as an incoming voice call to the communications handler 150. If non-voice, then the incoming communication may originate as a text message, which may be offered by the cellular data/internet 905 to a SMS text gateway 140. This will be provided as a text message to the communications handler 150. If the incoming communications is email, it will be handled by the Internet 123*b* and provided to an email server 135, which again will provide it to the communications handler 150. Finally, if the incoming communication is a chat, then that may involve the customer interacting with a chat server 145 via the internet 123*b*. Again, that communication will be provided to the communications handler 150. Thus, all the incoming communications are offered in some form, directly or indirectly, to the communications handler 150.

Although the communications handler is shown as a single device, it may comprise a collection of processing devices operating in a cooperative manner. The communications handler 150 may include a session management module 925, which functions to allocate the incoming communications session to one of the agents. It may also include the agent queue allocation module 920 and agent session allocation data 910. More specifically, the communications handler 150 will allocate the incoming communication session to one of the agent's computers 160*a*-160*d*.

The session management module 925 may query an agent queue allocation module 920, which though shown as separate from the communications handler, may actually be incorporated into the communications handler 150. The agent queue allocation module may access data in the agent session allocation database 910, which maintains information about which communications sessions an agent may handle, and how many. This information is provided to the agent queue allocation module 920, which informs the session management module 925 which agent an incoming communication should be directed to.

Figure 10:
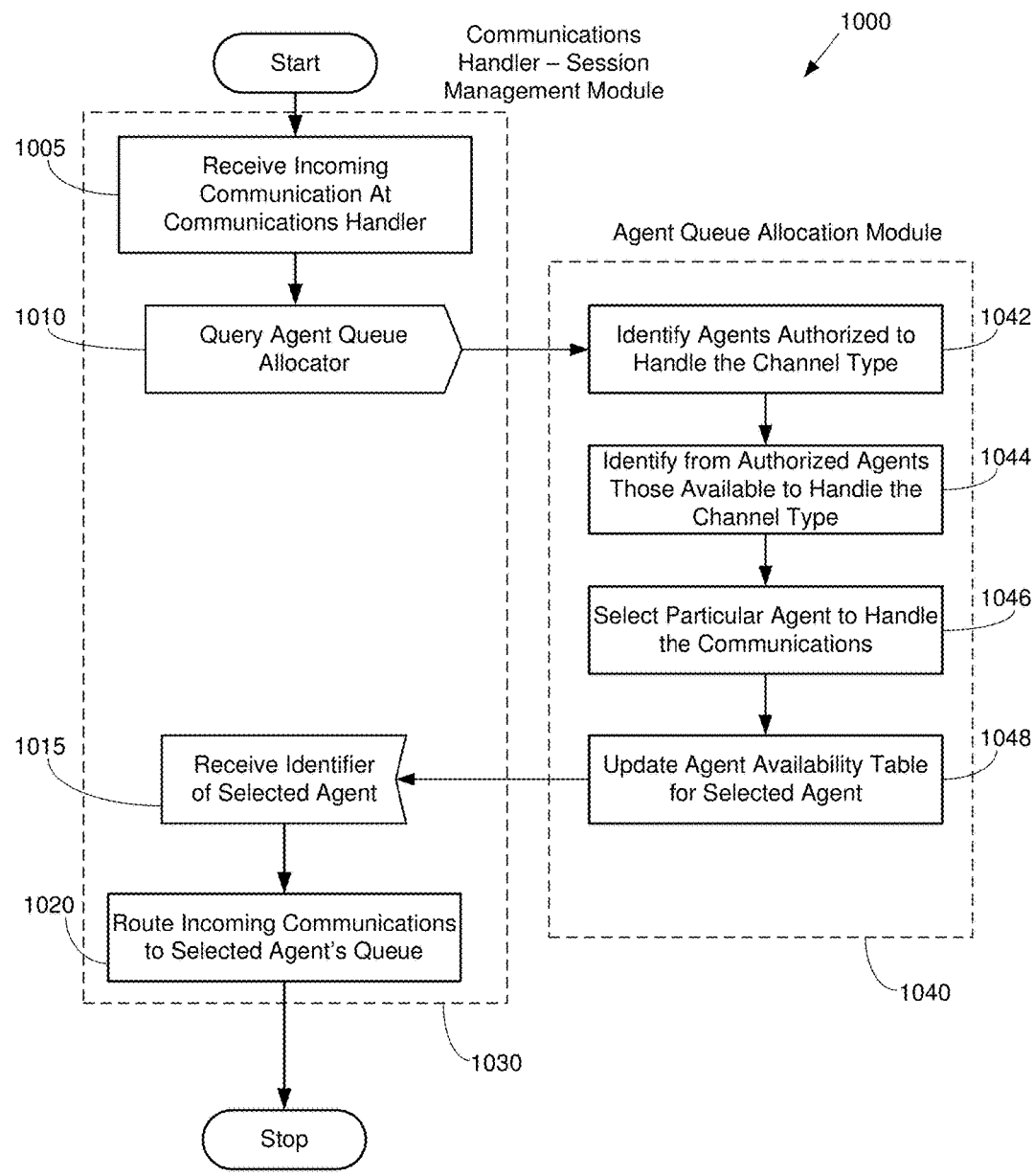
FIG. 10 illustrates one process flow involving a communications handler allocating a communication session to an agent.

The process involving the session management module 925 and the agent queue allocation module 925 is shown in FIG. 10 as process 1000. This is divided into steps 1030 performed by the session management module and steps 1040 performed by the agent queue allocation module. The process begins with an incoming communications received at the communications handler in step 1005. This may be a voice or non-voice form of communication. The session management module then initiates a query in step 1010 to the agent queue allocation module, providing information about the type of communication received, including the channel type.

The agent queue allocation module receives the request in step 1042 and identifies all agents that are authorized to handle that type of communication. For example, some agents currently logged in may not be authorized to handle non-voice communications, or a particular form of non-voice communications. Once the set of authorized agents is determined, the next step is to determine which of those authorized agents is available to actually handle that channel in step 1044. Once that subset of available agents are identified, then one of those agents is selected in step 1046. The actual algorithm used to select the agent from the pool of available agent may be based on a round-robin, longest waiting agent, lowest average handling time, etc. Next, the agent queue allocation module updates the information for that selected agent reflecting that the agent has been selected, and returns the response in step 1048. Thus, when the next incoming communication needs to be allocated, that agent's availability will reflect that recently assigned communication session. Correspondingly, when the agent completes that communication session, their availability table will be updated as well.

The agent queue allocation module, in response to a query, returns the agent that is to receive the incoming communication. This is accomplished in part by accessing a data structure indicating which agents can handle which type of communication session. One such data structure is shown in FIG. 11. Although FIG. 11 shows a table oriented data structure 1100, and number of other structures known in the art could be used.

FIG. 11 illustrates individual rows 1106, 1107, 1108, and 1109 that are associated with an agent. The agent's name (or other identification) appears in the first column 1105, which is shown via text, but may be an employee number or other form of agent identifier. The second column 1110 indicates the maximum number of voice calls that each agent may handle. It is quite frequent that an agent will be assigned to handle one voice call, and relatively unusual for them to handle two or more. Some agents, may be authorized as having zero maximum number of voice calls, which essentially means that the agent is not handling any voice calls. This may reflect that the agent has voice issues (a cold, sore throat, or other condition limiting speech) or is simply unable or inexperienced to handle a voice call. Some agents may begin their training in the contact center by handling only non-voice communication sessions initially.

The third column 1115 reflects the maximum number of simultaneous text communication sessions (sometimes also referred to as text calls) that may be allocated to an agent. Similarly, the fourth column 1120 reflects the maximum number of chat sessions that may be allocated to an agent. The fifth column 1125 represents the maximum number of email sessions that may be allocated to an agent.

Merely indicating the maximum number of voice, chat, email, and text communication sessions that the agent can engage in is not sufficient. An agent may be able to handle one voice call and one chat session, but if they are not handling any voice calls, then they may be able to handle two or three chat sessions. However, they are unable to effectively handle a voice call and three chat sessions (for a total of four session) simultaneously. Thus, other controls are required in order to limit the total number and mix of sessions as desired.

Thus, the sixth column 1130 indicates whether the agent is configured to only handle voice. If set to "yes", then the agent is only to handle voice calls. If so, the maximum number of non-voice communications such as chat, email, and text, should all be set to zero (or their values are ignored). Similarly, if the agent is configured via column seven 1135 to handle non-voice sessions only, then the number of voice calls for that agent should be set to zero. Some configurations are not allowed, such as configuring an agent for receiving only both voice and only non-voice communications, or neither voice and non-voice. Thus, setting both columns six 1130 and seven 1135 to "yes" is not allowed.

Finally, column eight 1140 indicates the maximum number of sessions that an agent is allowed to handle. For example, an agent may be able to handle three non-voice sessions simultaneously, regardless of whether they are, for example, chat sessions or text sessions. But, that agent cannot handle three chat sessions simultaneously with three text sessions, for a total of six sessions. Thus, by defining a maximum of three sessions, the agent may be assigned one chat, one text, and one email session. Or, the agent may be assigned two chat sessions and one email session, etc.

Various other combinations are possible. For example, the number of maximum sessions could be defined to be the maximum number of non-voice session.

Because the maximum number of sessions also include a voice session, a maximum of three sessions could include one voice session, one chat session, and one email session. Those skilled in the art will recognize that other functions/fields could be defined in additional columns to further limit how many communication sessions an agent may handle and of what type. For example, an agent handling a voice call may be able to handle one non-voice email communication sessions but not a chat session with a voice call. Those skilled in the art will recognize that other permutations and mechanisms are possible in defining what possible mix of communication sessions each agent can handle.

The agent session authorization table 1100 indicates which agents are authorized to handle which and how many communication sessions. In this embodiment, the table does not indicate how many communication sessions that agent is currently engaged in and thus available to handle, if authorized. There is a distinction between determining whether an agent is authorized to handle a particular communication session and whether the agent is available to handle that particular communication session. The former capability (authorized) is an authorization determination, e.g., whether the contact center administrator has allowed the agent to engage in such a communications session. Each agent will have a limit as to the maximum number of simultaneous communication sessions they are allowed to engage in. The latter capability (availability) is determining whether the agent can handle the incoming session in light of their currently allocated communication sessions.

At a high level, determining whether an agent is available to handle a communication session involves determining whether the agent is even logged in for handling communication sessions. For example, an agent that does not work the weekend shift will never be available to handle a call during the weekend, since that agent does not work on the weekend. Thus, even if that agent is authorized, they are not available. Or, if the agent is logged in, but in a "pause" mode, they are not available either.

Determining whether an agent is available goes beyond merely checking if they are currently logged in. It involves ascertaining what communication sessions they currently are engaged in. If their maximum limit of communication sessions is reached, then they are unavailable to handle another communication session. Further, their mix of communication sessions may be such that they are unavailable to handle an additional particular type of session. For example, an agent may be able to handle two simultaneous communication sessions, where one is voice and the other is non-voice. If that agent is already engaged in a voice call, then they are considered unavailable for handling another voice communication session.

The information required to ascertain whether the agent is available is found, in part, in the agent's current session table. This is a data structure that maintains information about the current sessions that the agent is engaged in. This includes which channel types and how long they have been engaged in each session. One such exemplar structure is the table shown in FIG. 12A.

Figure 12A:
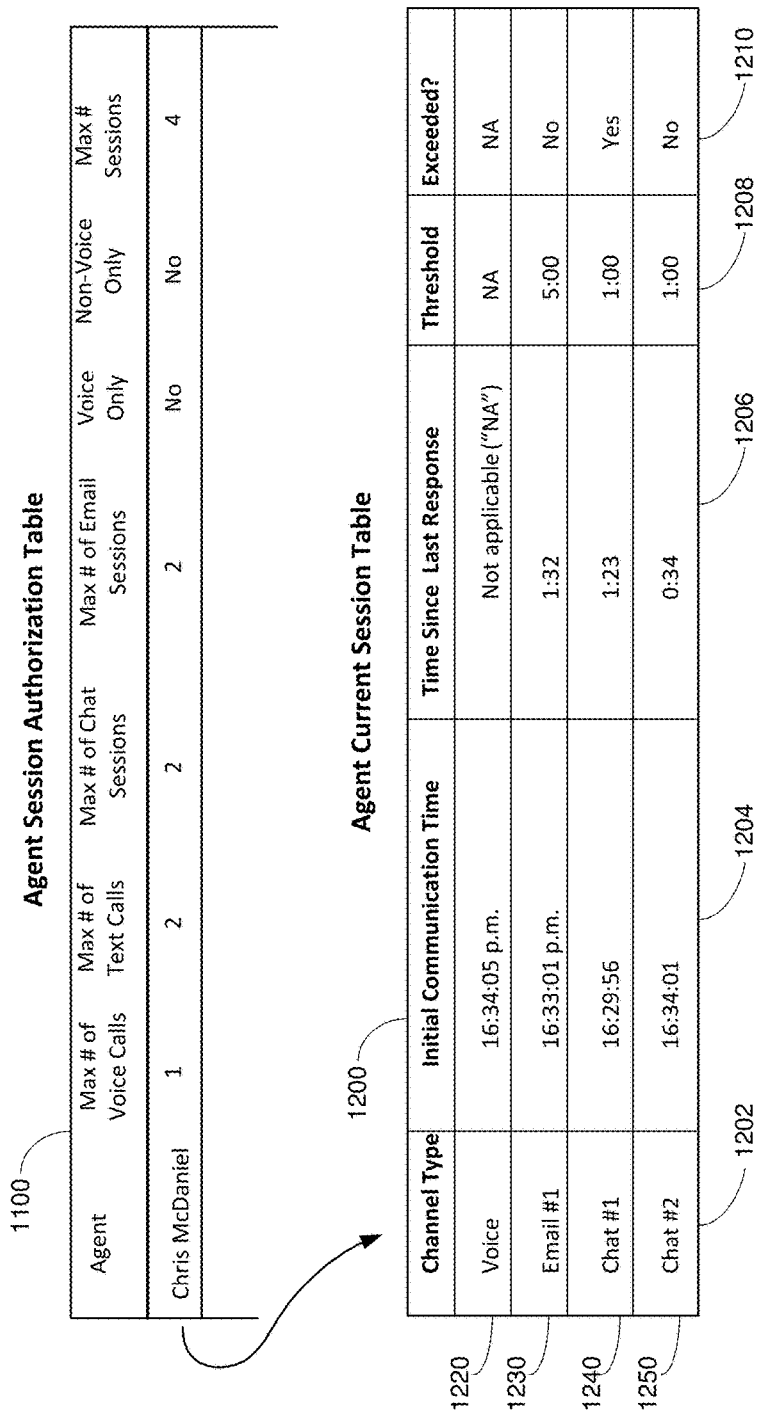
FIGS. 12A, 12B, and 12C illustrate possible data structures for managing current sessions for an agent.

Turning to FIG. 12A, a portion of the Agent Session Authorization Table 1100 is shown, with illustrating information related to one agent ("Chris McDaniel"). A pointer or link is provided that allows identification of that agents corresponding Agent Current Session Table ("ACS Table") 1200. The ACS Table has entries for each communication session that agent is presently engaged in. For example, the first row 1220 is indicated by the first column 1202 as being a voice channel type. This particular agent is also engaged in an email communication session (labeled as "Email #1") and two chat sessions (labeled as "Chat #1" and "Chat #2"). Other labels could be used.

From this column, it can be ascertained that this agent is current engaged in four communications sessions. From the Agent Session Authorization Table 1100, that agent has a maximum of four communication sessions allowed. Thus, this agent is not available for any further communication sessions at the moment. Further, the agent is engaged in two chat sessions, so even if the agent was available for one more communication session, the agent is only authorized for two chat sessions and could not receive a third one.

The second column 1204 in the ACS Table 1200 illustrates a time when that communication session was initiated. This may be determined by when the communications handler received the communication, selected the agent, informed the agent, or routed the communication to the agent.

This value is not necessarily required to know whether the agent is available to handle another communication session. Rather, this value is used to determine if the agent has provided adequate attention to that communications session. This value is used in conjunction with the third column 1206, which is the time since the last response on that communications channel. A threshold value, as defined in the fourth column 1208, can indicate an acceptable threshold for when the agent is expected to address a particular communications session. If the agent has not responded in a timely manner, and the threshold is exceeded as indicated in the fifth column 1210, then this may be indicative that the agent may be providing poor customer service. Simply stated, the agent may be overwhelmed with too many communication sessions. Although the agent may normally be able to handle four simultaneous sessions, it is possible that current circumstances only allow the agent to handle two effectively.

If the channel type of the communication session is voice, then the time since the last response is not applicable. If the agent is on a voice call with the customer, then it is presumed that the agent is responding property to the customer. If the customer, for example, asks a question and the agent does not respond, likely the party will ask the question again or request the agent's attention. Thus, it is more likely that the agent will focus their attention on servicing the voice call at the expense of non-voice communication sessions.

For example, the contact center may expect an incoming chat session to be addressed by an agent within a minute after notification of the agent. In this example, the agent has not responded for 1 minute and 23 seconds ("1:23"). This exceeds the allowable time for response. On the other hand, an email may have a much longer response time, such as five hours ("5:00"). In this case, the agent responded after one hour and thirty two minute ("1:32") from receiving the email and thus has not exceeded the response timer value. The thresholds of a response timer may vary for each non-voice channel type.

The number, frequency, and duration of the times where an agent has exceeded a threshold may be monitored for each agent, and used to determine whether the agent is overwhelmed and the number of simultaneous channels should be reduced. On the other hand, a lack of such thresholds being exceeded may indicate that the agent is able to handle an additional channel.

A variety of key performance indicators ("KPIs") could be used to also deduce whether the agent is overwhelmed or is able to handle another simultaneous communication session. Various KPIs known in the art include conversation rate, sale volume, or promise to pay. If a particular agent is having a better than average day (relative to their prior history or relative to other agents working on the campaign), then that agent may be given another simultaneous channel to handle. Conversely, if the agent's KPI indicators are below average, it may be appropriate to lessen the number of simultaneous allowed communication sessions. Thus, dynamically altering the number of authorized communication sessions can be varied for an agent in real time based on various types of performance parameters.

Figure 12B:
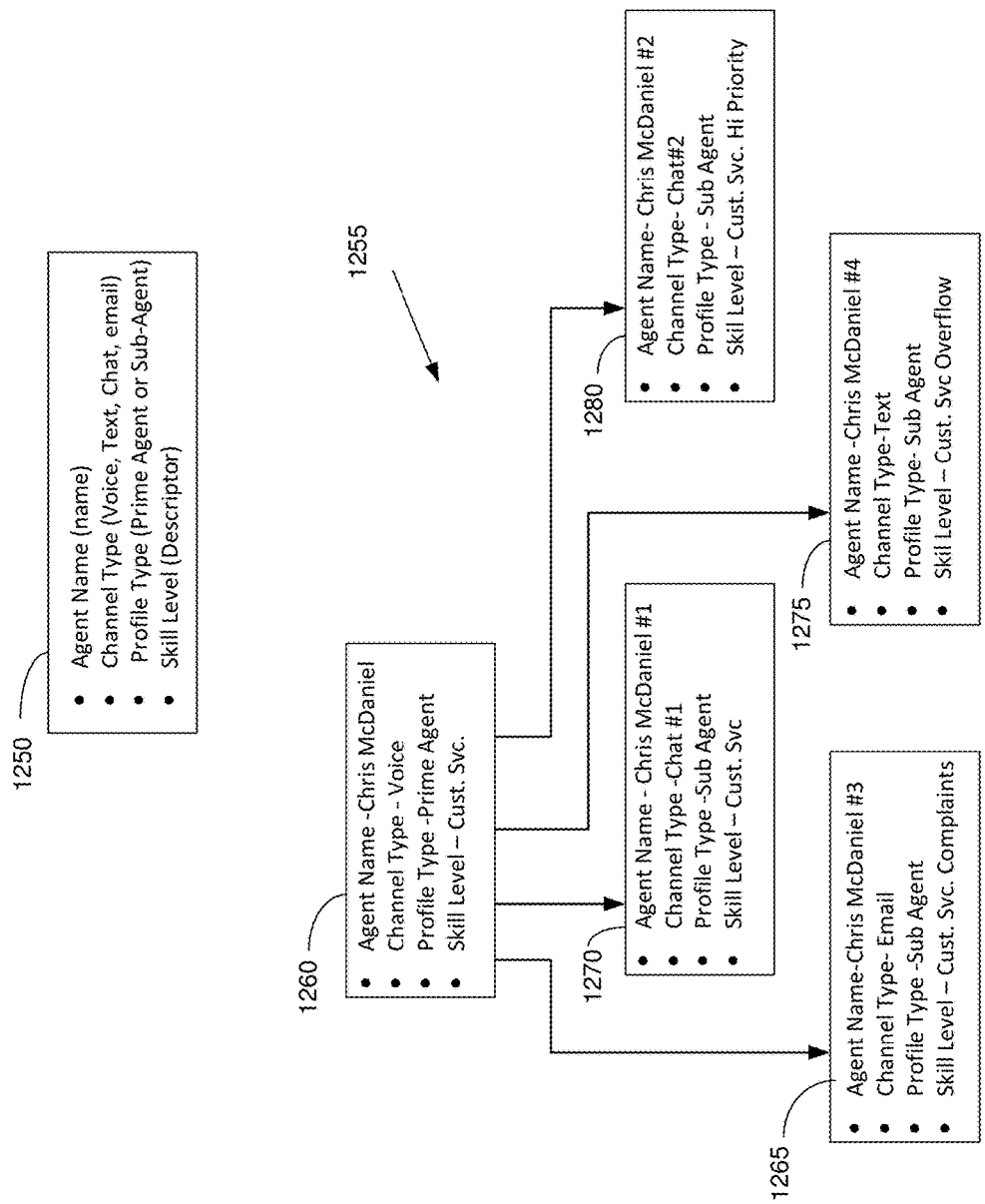

Another data structure for indicating how many sessions and what type an agent may handle is shown in FIG. 12B. This data structure accommodates a maximum number of sessions where each session type is fixed and capped as to a maximum number. While it may not be as flexible as the scheme associated with FIG. 12A, it may be easier to implement.

Turning to FIG. 12B, this arrangement is based on a generic agent profile data structure 1250 that contains information about an agent's name (name), a channel type (voice, text, chat or email), an profile type (prime-agent or sub-agent) and a skill level (define per application, such as "customer service" or "Cust. Svc.") The "agent name" and "channel type" are self-explanatory. The "profile type" is a descriptor that indicates whether the profile data structure corresponds to a master agent data structure (called the "prime" agent profile or simply "prime profile") or a sub-ordinate data structure (called the "sub" agent profile or simply "sub profile"). Each agent must have one prime profile (usually associate with a voice channel type) and may have zero or more sub-profiles (usually associated with non-voice channel types).

When an agent logs in, the prime profile is used to identify the agent and information associated with that agent, including and their main or default channel type. Usually, this is a voice channel. Thus, each agent logging in will normally be configured to handle a voice call. However, automatically the sub-profiles for that agent are also logged in. If there are no sub-profiles associated with the prime profile, then the agent is only handling voice calls. However, if there are sub-profiles, then the call handler is configured to handle multiple simultaneous sessions for that agent. These sub-profiles may reflect an agent alias name that is associated with the name found in the prime data structure. Usually the name in the sub-profile is a variation of the name in the prime-profile.

The configuration 1255 shows one example. In this example, which is for agent Chris McDaniel, there is a prime profile data structure 1260 which is used when the agent logs in. This includes various agent related data, (most of which is not shown), but will includes information about the prime channel type, which is voice, an indication of the profile type (the prime profile) and a skill level (customer service).

Further, this prime profile is linked to four other sub-profiles, 1265, 1270, 1275, and 1280. The first sub-profile 1270 reflects an alias name, which is "Chris McDaniel #1" so that a human reviewing this information knows it is related to a prime profile for Chris McDaniel. This sub-profile indicates the agent is configure to handle a chat session, and "chat #1" is used because the same agent is able to have a second chat session ("chat #2") as is indicated in a second sub-profile 1280. The third sub-profile 1265 reflects the agent can also handle an email session and the fourth sub-profile 1275 reflects the agent can also handle a text session.

This type of structure 1255 means that when the agent is logged in, they are able to handle one voice session, two chat sessions, one email session, and one text session simultaneously. This structure does not necessarily provide flexibility in allowing e.g., only three non-voice sessions, which could be one or more of chat, email, or text channel type. This structure indicates that there are four non-voice sessions simultaneously allowable, and the mix can only be two chats, one email, and one text. Thus, if the agent is currently engaged in only one email session (and nothing else), then the agent is unavailable to handle a second email session. However, if the agent is engaged in one chat session, then they are available to handle a second chat session.

Some flexibility is provided by the "skill level" descriptor. The skill level is a label used to indicate whether the agent is capable of handling a communication session of a certain type. This requires the call handler to associate each communication session with a skill level, and then only agents with the corresponding skill level can handle that communication session. The use of "skill levels" for voice calls is well known. For example, Spanish speaking agents may have a skill level "Spanish", so that calls involving Spanish speaking callers are routed to agents capable of speaking Spanish. In this example, agents trained to handle customer service communications may be segregated from other agents (e.g., handling complaints, orders, returns, etc.)

For example, a skill level may be "customer service" ("Cust. Svc."). In this example, the prime profile 1260 reflects the agent can handle "Cust. Svc." type voice calls. In addition, the agent can handle via sub-profile 1270 a chat based customer service session. The agent can also be assigned to a chat via sub-profile 1280 that is "Cust. Svc. Hi Priority" which are high priority customer service chats. As for email session types, the third sub-profile 1265 reflects that the agent only handle "Cust. Svc. Complaints" type emails. Similarly, for text sessions, the fourth sub-agent profile 1275 reflects the agent can handle "Cust. Svc. Overflow" type texts.

By assigning various skill levels, the volume of communication sessions to each agent can be controlled. For example, most communication sessions received may be classified as "Cust. Svc." which means any agent assigned to that skill may handle such communication. In this example, Chris McDaniel, could expect to handle a voice call and chat session involving customer service issues. If a small percentage of customer service communications involve high priority, complaints, or overflow communications sessions, then this agent can expect to handle additional communication session of the corresponding type involving these skills, but only when those calls are received.

FIG. 12B represents another approach for configuring and maintaining data regarding how agents are allocated to handle various types of communication sessions. This approach may be easier to adapt existing call handling systems into handling multi-session communication sessions. Those skilled in the art may devise other variations based on the disclosure herein for maintaining such agent configuration information.

Figure 12C:
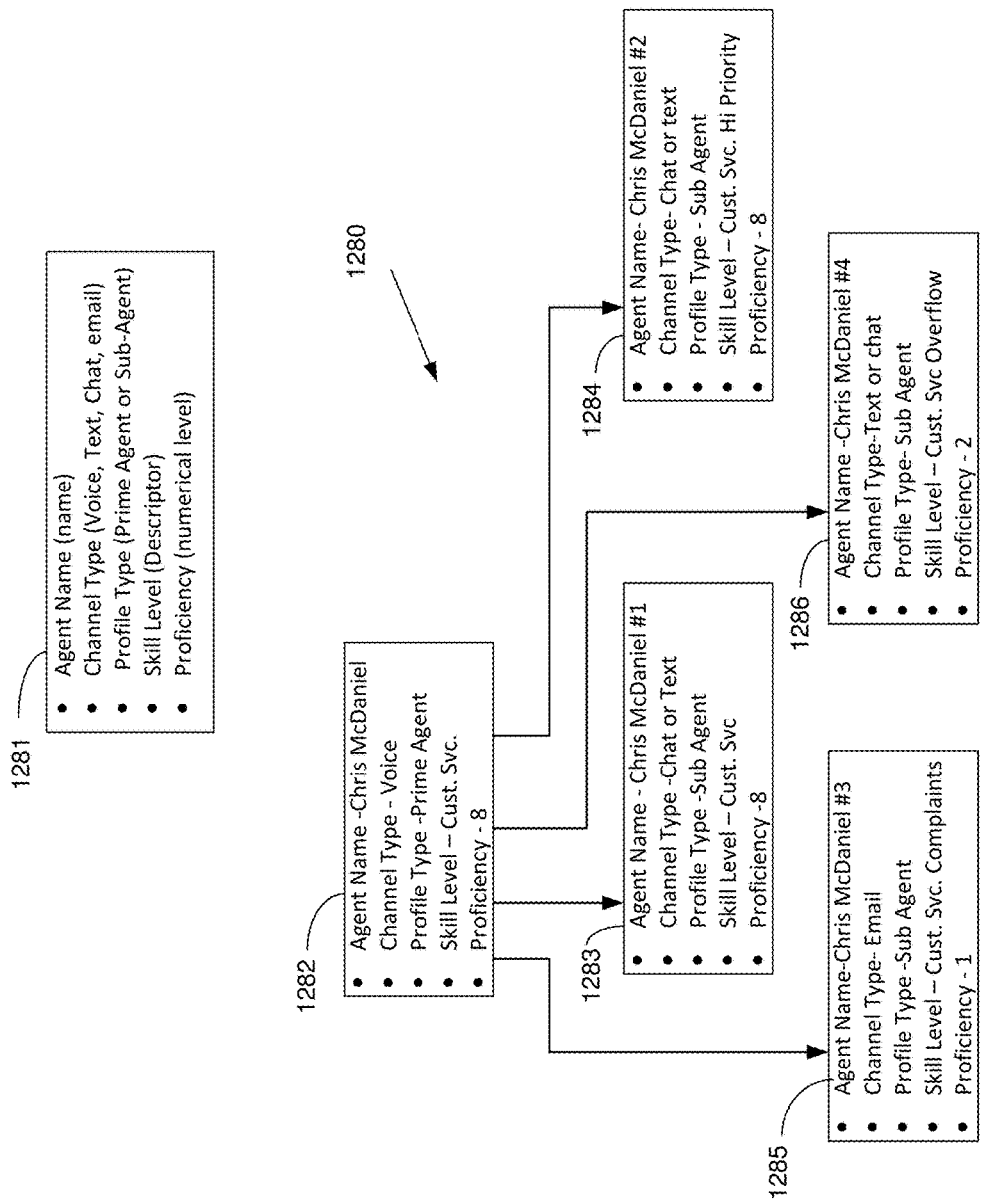

FIG. 12C shows yet another embodiment 1280 for configuring and maintaining data regarding how agents are allocated to handle various types of communication sessions. Turning to FIG. 12C, and focusing on structure 1281, the agent can be assigned to more than one non-voice channel, and in addition to a skill level, there is a proficiency level indicator. The proficiency level indicator reflects how well that agent can perform the skill indicated in the skill level. For example, a skill level may be "customer service—Spanish speaking" (which implies there is a "customer service—English speaking" skill level as well). Thus, these skill levels can reflect which agents are able to handle Spanish speaking callers, in addition to, or instead of, English speaking callers. However, not all Spanish speaking agents necessarily have the same proficiency level in speaking Spanish. Some may speak Spanish as a first language, whereas it may be a second language to others.

A call will be assigned a skill level and minimum proficiency level, and this information can be used to determine which agent to assign for that call. Further, the proficiency level may be adjusted dynamically, i.e., while the call is being queued for an agent, to reflect changes in urgency. For example, in the example in FIG. 12C, structure 1282 reflects that the agent can handle voice calls that involve customer service, with a proficiency level of 8. (In one embodiment, the scale is 0-9 with the higher number indicating a higher proficiency. Other ranges may be used.)

Turning to the non-voice structures 1283-1286, structure 1283 indicates that the agent can also handle either a chat or text session with a proficiency of 8. Likely, a chat or text session will be initially allocated to any agent with a proficiency of 5 or higher. Similarly, the agent, as shown in structure 1284, can also handle a second chat or text session, for high priority customer service sessions, also with a proficiency of 8. Thus, this agent can handle two text sessions, two chat sessions, or a chat and text session with a proficiency of 8.

The agent can also handle an email session as reflected in structure 1285 and a third text or chat session in structure 1286. Thus, the agent can handle up to four non-voice sessions. However, this may be beyond the normal limits of the agent, so by assigning relatively low proficiency levels (i.e., "1" in structure 1285 and "2" in structure 1286), the agent is unlikely to receive these additional sessions. In one embodiment, the minimum required proficiency for handling an email, text, or chat session may be set at 5. Thus, this agent would normally not be allocated an email session as reflected by structure 1285, nor the third instance of the text/chat session in structure 1286. However, if waiting times increased, or there were a shortage of suitable agents, the text/chat requirements could be adjusted to have a minimum proficiency of e.g., 1. This means that the agent would be potentially assigned three simultaneous chat/text sessions (those associated with structure 1283, 1284, and 1286). If additional resources were required for email (as reflected by lowering the required proficiency to 1), then the agent may be selected for an email session.

The use of a proficiency indicator, along with the skill level, allows additional flexibility in allocating resources in changing situations. Further, allowing multiple non-voice session types to be indicated also provides additional flexibility in how different channel types can be allocated to agents. No doubt those skilled in the art may develop other variations as to how agents and communication sessions can be combined.

Processing Agent Input for Switching Communication Sessions

The agent is presented with a current session information pane ("CSIP") at all times when there are one or more active communication sessions with the agent. The determination of which CSIP is presented depends in part on which one has been selected by the agent.

The process for an agent selecting and switching the CSIP can be explained by first reviewing the presentation of the CSIP beginning first when the agent first logs on. At that time, the agent does not have any communication sessions active and there is no CSIP presented. (Alternatively, an empty, null, generic, or placeholder CSIP may be presented.) Assuming that the first incoming communication to the agent is a voice call, this will result in the agent being presented with a voice session information pane. Since the agent has no other communication sessions, this first one will result in automatically presented the appropriate CSIP. That format, structure, and layout will be governed for the particular campaign that the voice call is associated with. During the voice call, the agent will then be speaking to that party and viewing the voice CSIP.

During the call, the agent may be then select to receive another incoming communication. Since the agent is on a voice call, most likely the incoming communication will be a non-voice call. This will result in a notification or indication of an incoming non-voice communication on the MS-GUI. This may be accomplished by altering the visual characteristics of a corresponding communication session indicator. For example, returning to FIG. 4, the text on a non-voice communication session indicator 460 could be altered in some way, including emphasizing it by altering its size, color, or text. This alerts the agent of the presence a pending non-voice communication of a particular channel type.

The agent may select the corresponding communication session indicator by using e.g., a pointing device, such as a mouse, or a function key. The selection of the communication session indicator results in altering the CSIP to that of the channel type corresponding to the selected communication session indicator. The non-voice CSIP will be populated with information for that particular non-voice communication session. The agent may select another communication session indicator (provided it has an active communication session associated with it) to again replace the CSIP. Thus, the agent could, for example, toggle back and forth between a voice CSIP and a particular non-voice CSIP.

Figure 13:
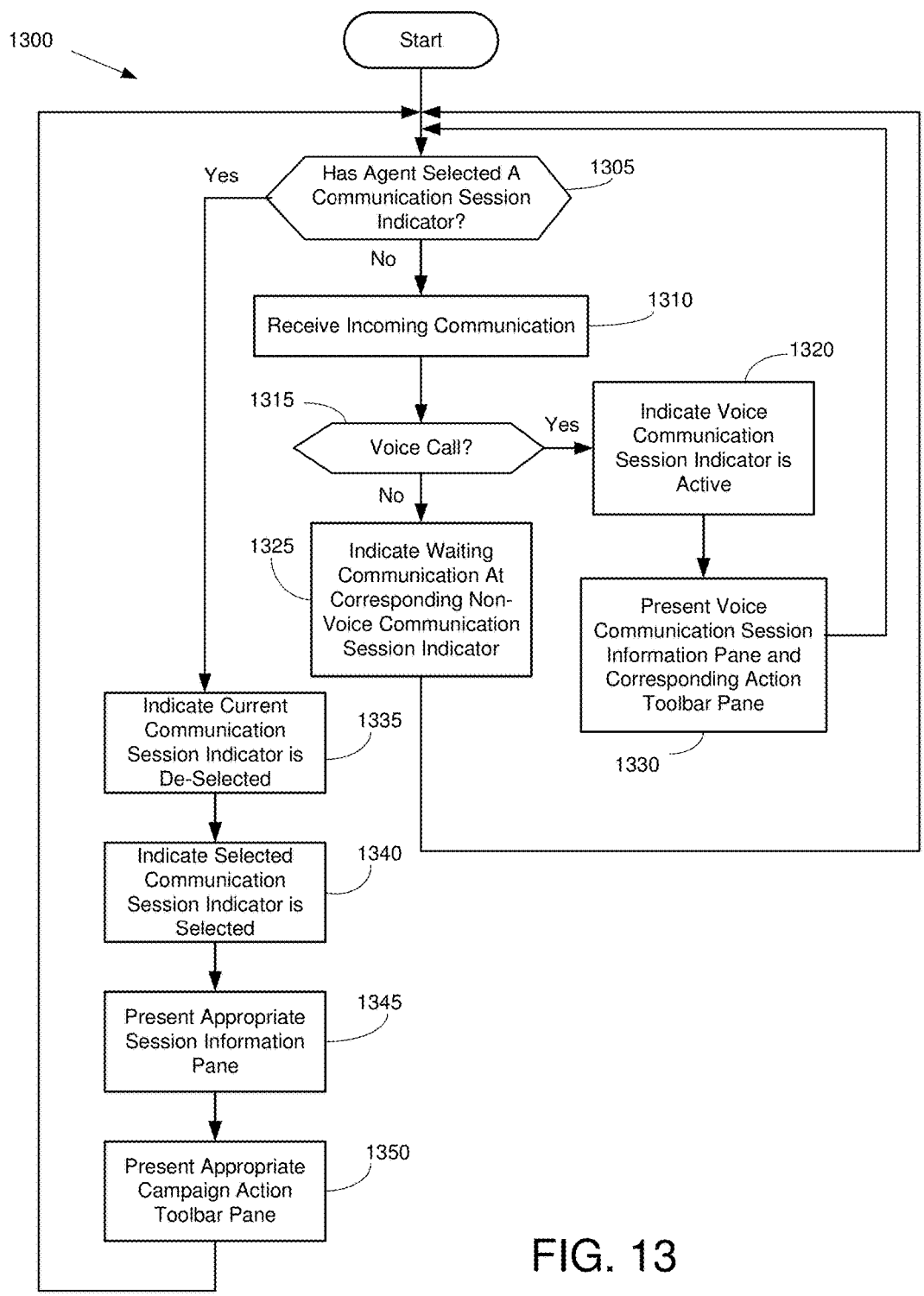

One embodiment of this process 1300 is illustrated in FIG. 13. The process begins with first determining whether the agent has selected a communication session indicator in operation 1305. For the initial pass, it can be assumed that there are no pending communication sessions, and hence there would be no reason for the agent to select a communication session indicator. Thus, the process proceeds to receiving an incoming communication that is routed or selected to be handled by the agent in operation 1310. A test occurs as to whether this communication is a voice call (or a voice channel type) in operation 1315. In one embodiment, a voice call is treated slightly different from a non-voice call in that the CSIP will automatically be displayed to the user upon the agent being connected to the call. In this case, this will be the first communication for the agent so the CSIP will be displayed to the agent. Thus, the process continues to indicate to the agent that the voice session indicator is active in operation 1320, and the voice CSIP is presented to the agent in operation 1330. The particular communication session may be associated with a particular campaign, which may be different from the current communication session, and if so, the corresponding campaign action toolbar pane would also be presented with the voice CSIP in operation 1330. The process then returns back to operation 1305, where it waits for the agent to select a communication session indicator.

If there is no other communication session for the agent to select, then the process then waits for another incoming communication that occurs in operation 1310. A test will be made if that is a voice call is operation 1315. Since typically an agent will be authorized to handle only one voice call, and the above example is based on the agent already having a voice call, the answer at this point must be "no." Thus, the process continues to operation 1325 where the agent is informed of the incoming communication, which is pending review by the agent. This is accomplished by various visual indicators bringing attention the status of the associated non-voice communication session indicator. For example, the non-voice communication session indicator may change color or a text label may change. At this point, the process loops back to operation 1305.

The agent may opt to select that particular non-voice communication session indicator. If so, the process continues to operation 1335 that "de-selects" the currently selected communication session indicator. This may involve that particular communication session indicator changing color or altering a text label. Next, the selected communication session indicator is then indicated as selected. This may involve altering the color, text, or other visual indicator. Next, in operation 1345 the corresponding CSIP of the newly selected session indicator is presented to the agent. In this particular example, this would replace the current voice-oriented CSIP with that of the non-voice CSIP. Thus, if the second incoming communication was a chat, then the chat CSIP would be displayed, along with any initial chat message from the party. If a different campaign action toolbar pane is associated with the communication session indicator, then that too is displayed in operation 1350. The operation then returns back to operation 1350.

In this example, the first communication session is voice, and the second communication session is a chat. Although the agent may have selected the chat communication indication indicator, and a chat CSIP is displayed, the agent is still connected to the voice call. Thus, voice calls are treated differently from non-voice communication sessions in that selecting a different non-voice communication session does not interrupt the voice call to the agent. On the other hand, if the current session is a non-voice session, selecting another non-voice session does "interrupt," in a manner of speaking, the prior non-voice session. The "interruption" is characterized in that the agent responding via keyboard entry will result in that text being associated with the current communication session.

Returning to FIG. 13, if there were another non-voice communication offered to the agent, the agent would be presented with the notification on the corresponding non-voice communication session indicator, but until the current CSIP remains in place until the agent selects another communication session indicator.

Terminating a Communication Session

Not shown in FIG. 13 is the impact of when a particular communication session is terminated. When a communication session ends, the status on the corresponding communication session indicator reverts to an after-call-work state. That is, the session indicator reflects that no pending communication is completed and the agent is presumed to be engaged in work as a result of the communication session, and no further incoming communication sessions can be offered for that communication session indicator until the work is completed. The CSIP may likewise disappear, may be altered to reflect an "after call work" state, or the CSIP may be presented (with an indication that the communication session has just ended) until the agent selects another communication session. Once the agent indicates the after-call-work is completed, the CSIP may be modified to present a generic CSIP, or that of another pending session. Once the session is disposition, then the communication session indicator will then revert to a "WAITING" state.

How the communication session transitions into the after call waiting state may vary based on the channel type. A voice communication session may end when one of the parties hangs up the call and the communication session indicator may automatically transition from "CONNECTED" to "AFTER CALL WORK." Next, the agent is typically require to disposition the call, which involves entering a code defining the outcome of the call. Once that code is entered, the communication session indicator may transition from "AFTER CALLL WORK" to "WAITING." The corresponding CSIP may be removed and one of the other CSIPs may be presented.

Knowing when a non-voice communication session ends is not always as obvious. A customer may initiate a single chat, email, or text message without ever sending another message or waiting for a response. In some cases, there may be a timeout which automatically closes the chat window or presumes the communication session has ended. This would cause a transaction from "ACTIVE" to "AFTER CALL WORK." In some embodiments, the receipt of a single email followed by a single response will be deemed by the agent to have ended the communication session. Essentially, this presumes that an email session comprises an initial email message followed by a response. In some embodiments, the agent may perform after call work while the status is still listed as "ACTIVE", and upon entering the disposition code, the status changes to "WAITING."

If the agent enters a disposition code at the end of a non-voice communication session for a text or email communication session, thinking the session has concluded, it is possible that the session has not, in fact, been concluded. The customer may have simply waited a long time (e.g., several hours to several days) to send a second email message to the contact center and intended to continue the initial communication session. Thus, being able to accurately ascertaining when a text or email communication session is completed is difficult. To avoid this ambiguity, in one embodiment, a second email from the customer can be simply treated as a separate communication session.

One approach is to presume that a response to an email ends the communication session and to simply correlate the next incoming text or email communication from that customer with the prior text or email communications involving the same party. Thus, an inquiry email #1 and response #1 is considered a stand-along communication session, and when inquiry email #2 is received from the same originating email address, it is presented to the agent in the CSIP along with the email #1 and response #1. That way the agent can review the incoming email #2 and ascertain whether it is related to email #1. The agent can be presented with a user interface allowing them to scroll further back to earlier emails. Thus, the agent can readily ascertain whether the current communication session is intended to continue the prior communication. If so, the prior communication session can be reviewed for appropriate context. This approach simplifies the determination of when the communication session ends, and compensates for any mis-determinations by allowing the agent to determine based on context whether the current session is, in fact, intended to be a continuation of the prior session.

Operation with Outbound Communications

The above discussion is illustrated in the context of selecting an agent for an inbound communication. However, the concepts and technologies herein can be applied for outbound communications as well. For an outbound voice communication, if the agent is authorized and available to initiate an outbound voice call, then concepts disclosed can be applied, with slight modifications within one skilled in the art reviewing the present disclosure. For example, if the agent is authorized to handle outbound voice calls (such as in a preview or manual dialing mode), a corresponding voice communication session indicator could be presented to the agent. Either automatically, or after selection of the communication session indicator, the voice CSIP would be presented to the agent. The agent could then invoke one of the functions on the campaign action toolbar to initiate an outbound call or accept one that was just initiated. At that point, the procedures are largely the same as if the call had been accepted as an incoming call. Similarly, if the outbound call is predictively dialed, the voice CSIP could then be automatically displayed to the agent upon the call being connected with the agent. In this case, the agent would not perform any function to receive the call.

For non-voice communication sessions, the agent could first select the appropriate non-voice communication session indicator, namely one that is in a "waiting" state. If the communication session indicator is already involved in a voice communication, then it cannot be used to originate an outgoing non-voice communication. Once the non-voice communication session indicator is selected, then the non-voice CSIP is presented to the agent, and the agent can invoke a function for originating the particular non-voice channel type communication session.

The agent session authorization table 1100 of FIG. 11 and the current session table 1200 of FIG. 12 can be modified to reflect whether the agent is authorized for outgoing or incoming communication sessions. Thus, it is possible to track whether the agent is current involved in an outgoing or incoming communication session and to define authorization levels for different types of incoming/outgoing channel types. Similarly, and reports generated can reflect whether the agent is active in an incoming versus outgoing communication, as well as their respective performance characteristics.

Other Embodiments

The non-voice communication channel types have been illustrated using chat, text, and email. Other non-voice communication sessions could be accommodated, such as instant messaging, fax, social media, postal letters, etc. Each such communication session would require an appropriate designed CSIP and communication session indicator on the GUI. The functions defined to be invoked for a particular CSIP may be unique to that channel type. Each channel type would still require the agent to enter a disposition code at the end of the communication session, so that the communications handler would know when the session has terminated and the communication session indicator and other aspects of the MS-GUI can be updated.

In addition, the mechanisms for dynamically altering the agent session authorization table values could be manually performed by the agent or the supervisor, in order to 'downgrade' or 'upgrade' the number of simultaneous communication sessions authorized for an agent. The values could also be altered based on input from external systems, such as a performance management system, workforce management system, or a speech analytics system that monitors various key performance indicators for an agent. Any of these systems may be configured to alter the agent's authorization level in response to changing circumstances or performance indicators.

The above embodiment illustrates displaying a single CSIP based on the agent selecting a communication session identifier. This may be premised, in part, on the agent having one display monitor. For agents that have two display monitors, two CSIPs could be simultaneously displayed. One monitor could display, for example, a voice-oriented CSIP and the other monitor could display one of the several non-voice-oriented CSIPs. Thus, one screen would be used solely for voice and another screen would only be used for non-voice, and the non-voice screen would still display only the current selected non-voice communication session. In this embodiment, one of the screens could display the voice communication session indicators which the agent would select and the other the non-voice session indicators. In another embodiment, both screens could display all of the communication session indicators (essentially duplicating them) and the agent could select from either monitor.

The examples of the communications session information panes shown in the diagrams are illustrative. Those skilled in the art may define additional or alternative information to be presented to the agent. While scripts and prompts, prior call history, account notes, and account information are common types of information, other information may be presented in addition or instead of the above information.

Processing Agent Input for Pausing Communication Sessions

An agent may request to "pause" their active communication sessions. This may be construed as a request to temporarily suspend any further incoming sessions with the agent. Once the active communication session are completed, the agent can then focus on other matters, potentially address non-communication session work activities, take a break, etc. Because the agent may be currently involved in a communication session, the pause request typically does not immediately allow the agent to then focus on the non-communication session activity. Regardless of whether the session the agent is involved with is a voice or non-voice session, the agent cannot immediately interrupt and cease interaction with the remote party while the session is active.

A potential exception to this rule may exist for certain non-voice sessions, such as for an email communication session. An email session may have a fairly lengthy response time between the agent and the remote party. It may be on the order of several hours. Thus, a contact center may have a policy or rules in place requiring that a response to an incoming email be sent within two hours. This expected response time may be sufficiently long to allow the agent to request a pause, even though this could be considered as occurring in the middle of a non-voice session. The pause may be for a short period of time—e.g., expected to last 10 minutes or so. This would not adversely impact the ability of the agent to respond to the email session, but would adversely impact the response time for a chat session. Alternatively, an email session could be classified as completed as soon as the first response is provided by the agent. If the remote party initiates another email, it would be considered as a separate communication session.

Figure 14:
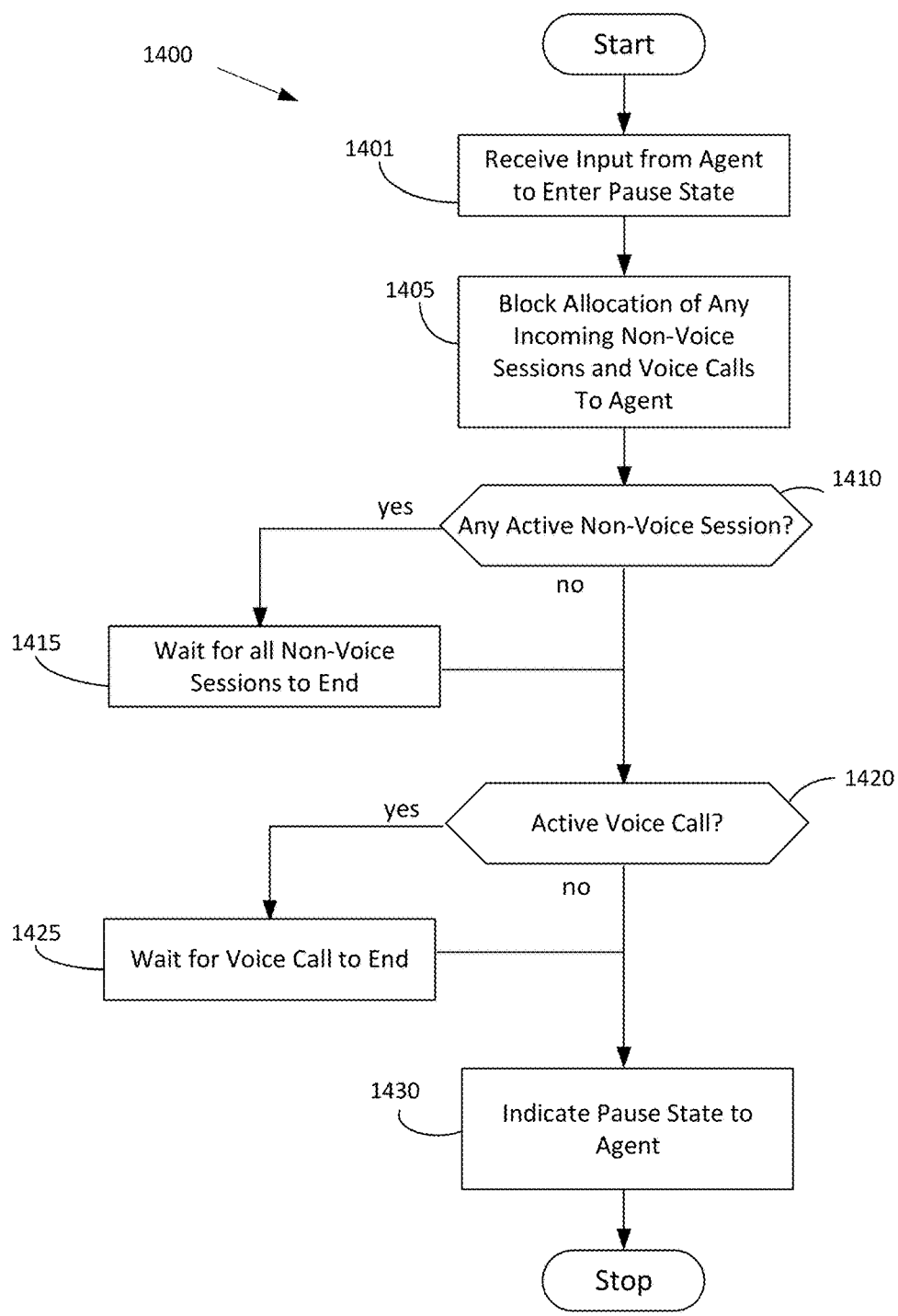
FIG. 14 illustrates an embodiment of one process flow for pausing a plurality of communication sessions for an agent.

A process flow showing how a pause request from the agent could be handled is shown in FIG. 14. Turning to FIG. 14, process 1400 begins with receiving input from the agent requesting to enter the pause state in operation 1401. This may be conveyed by the agent selecting a pause icon on their graphical user interface. The mere request for entry into the pause state does not necessarily put the agent into a pause mode, because there may be active sessions.

In this embodiment, the first result of the agent requesting to enter a pause mode is to block any new incoming communication sessions to that agent in operation 1405. That results in blocking any new incoming voice calls and any non-voice sessions. The determination of what constitutes a new call or communication session is straightforward for a voice call or chat session. For texts, emails, and other channel types, it may not be so straightforward, as it may not always be clear when the session is completed.

In one embodiment, a text or email message received at the contact center from a particular address of a remote party may result in starting a timer and flagging the selected agent as being involved in a respective communication session. If a further text or email is not received from that particular address prior to expiry of the timer, then that session is considered to have expired. In some embodiments, the response from the agent may signal the termination of the communication sessions. In other embodiments, the agent may explicitly indicate when that session is over. For example, a times may be started when an agent receives a text from an individual. The agent may respond to the text, and the sending of the response causes the session to be over. If no response is sent or if the timer expires without receiving another text from the remote party (the timer may be set e.g., on the order of 10 minutes), then the session may be considered as completed. Alternatively, the agent could explicitly indicate that the session has completed after sending the text. Similar mechanisms may be defined for email and other non-voice communication channels. It is possible that different non-voice channels may have different algorithms for determining when the communication session is completed.

Next, a test is executed to determine whether there are any active non-voice sessions in operation 1410. If there are, then the process continues to operation 1415 where a wait occurs for these sessions to end. Once those sessions are completed, the process continues to determine whether there are any active voice calls in operation 1420. If there are, then the process then continues to wait for them to expire in operation 1425. The tests shown in operation 1410 and 1420 could occur in a reverse order, or essentially in a parallel manner. Recall that during this time, no more incoming communication sessions are being offered to the agent. Once it is determined that all active communication sessions have ended, an indication may be presented to the agent on their workstation in operation 1430 indicating that the agent has been "paused" (e.g., entered the paused state). The process is completed.

An aspect borne out by the process flow in FIG. 14 is that that an agent requesting to be paused does not reach the paused mode while there are active sessions. The paused mode is entered when all the sessions are terminated. Once the agent is not involved in any active sessions, then the agent can then direct their attention to other matters, as appropriate. Unlike conventional call handlers that only examine the voice call status to ascertain whether to place the agent in the pause state, in this embodiment, the other non-voice call sessions must be considered as well before moving the agent into the paused state. Once the agent is ready to resume handling sessions, the agent can exist their pause state and then communication sessions can be offered to the agent.

Tracking Assigned Channel Types at Agent Login

In one embodiment, an agent logging into the system is automatically logged in for a plurality of scheduled channel types. An agent may be scheduled to handle certain voice and non-voice communication sessions during their shift. When the agent logs in, the agent is automatically added to the corresponding queues and is eligible to start receiving communications for any of the channel types they are scheduled for.

However, in other embodiments, the agent may confirm the channel types they are scheduled for before being added to the queues to receive communications. This allows the agent to confirm whether they believe they are able to handle the scheduled channel types. It is possible that the agent believe, under various physical/mental conditions at the time of login, that they are not able to adequately handle the scheduled multiple channel types. Thus, the agent may confirm whether they believe they are able to adequately handle the scheduled channel types. For example, an agent may arrive at work with a headache, cold, or "mental fog" that precludes them from effectively handling multiple sessions. The agent may start their shift handling a single channel type, and then add more channel types during their shift.

Figure 15:
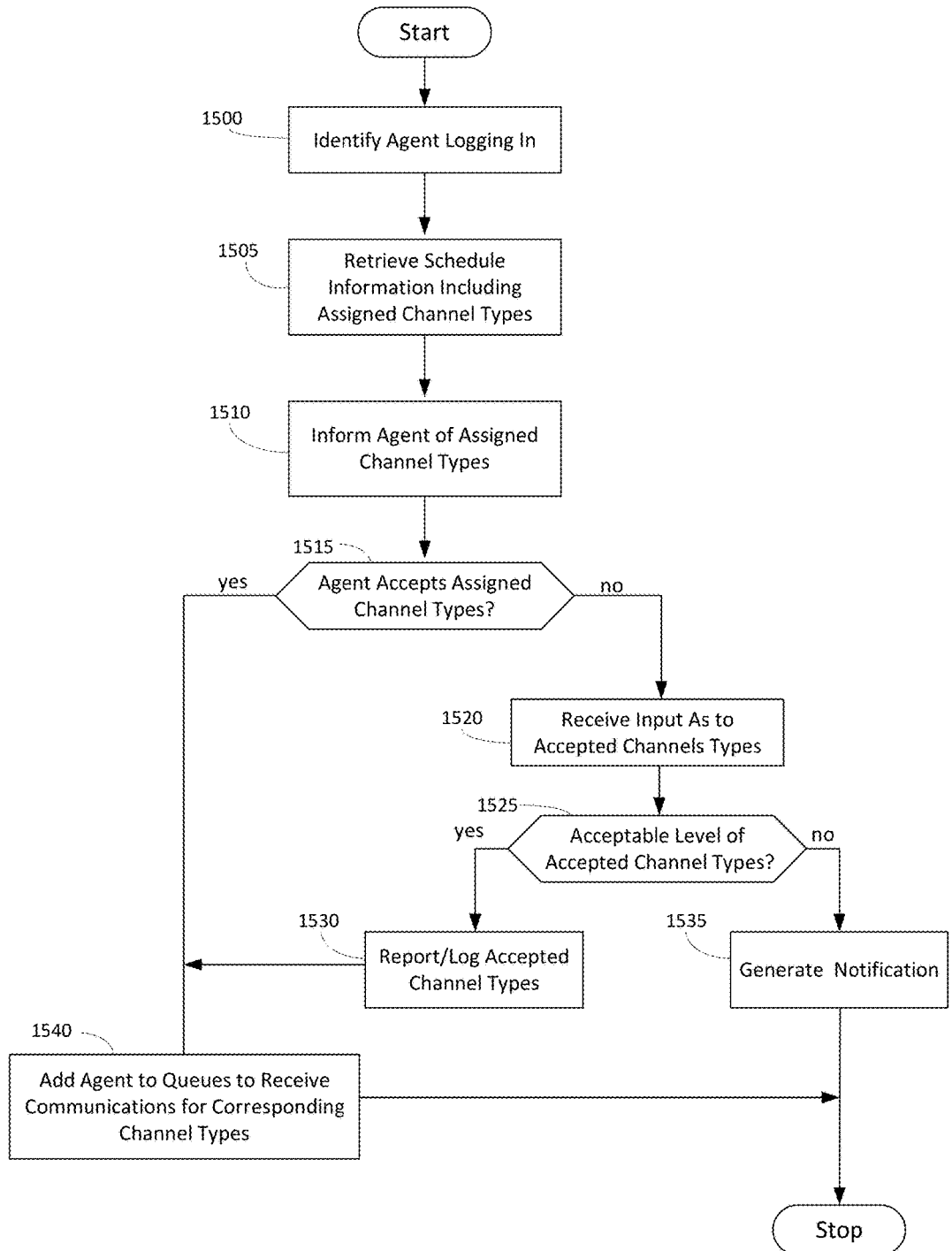
FIG. 15 illustrates an embodiment of one process flow for managing channel type schedule for use by an agent at login.

One embodiment of this process flow is shown in FIG. 15. The process begins with identifying an agent upon login at operation 1500. Next, the communication system will retrieve schedule information for that agent in operation 1505, including the various channel types that the agent is capable of handling and/or scheduled to handle. Next, the agent is presented with information regarding the channel types that are assigned to that agent in operation 1510. This information may comprise the various channel types the agent is scheduled to handle, or it may be a list of the channel type that the agent may potentially select from to handle. In other words, the agent may be scheduled for two sessions across two channel types, but may elect to handle three sessions across those two channel types or two sessions across three channel types. Thus, there are a number of ways that the agent could elect a variation of what was scheduled to be handled by the agent.

The agent may then accept the assigned channels in operation 1515. The agent may simply accept all the assigned channels, or confirm which channels they believe they are able to effectively handle for that shift. If the agent accepts all channel types (and potentially the maximum number of simultaneous sessions for each channel type) that are scheduled, then the process continues to operation 1540, where the accepted channel types are allocated to the agent for that shift. Essentially, the agent is assigned to queues for those corresponding channel types in operation 1540, whereby the agent is then ready to accept calls. The process then terminates.

If, at operation 1515 the agent does not accept the assigned channels but elects a different set, the input of the accepted ones are received in operation 1520. At this point, a test is made to determine whether the accepted channel types are acceptable to the contact center operator in operation 1525. If so, then the accepted channel types are recorded in a log, or reported to an entity, in operation 1530. If unacceptable in operation 1525, then a notification of the situation may be generated and transmitted in operation 1535. This may be sent to a supervisor, reporting system, administrator, workforce management system, etc.

A reason for the test in operation 1525 is that an agent may be scheduled for multiple channel types. The agent may be provided with limited flexibility for selecting which channel types they are able to effectively work. For example, an agent may be scheduled to simultaneously handle: a voice channel, two chats, and an email session. The agent may be compensated extra for handling these multiple channel types, and furthermore, the agent may have been specifically scheduled for their ability to handle multiple channel types based on when a higher volume is expected. Thus, if an agent logs on, and is able to only handle a voice channel type or only a single email session, this may negate the reason for scheduling the agent or paying them the additional compensation. Furthermore, this may adversely impact the ability of the center to handle the anticipated traffic volume. The administrator may elect to ask whether e.g., another agent (who is capable of handling the multiple sessions) could work overtime. Thus, what is determined to be an acceptable level of channel types that the agent elects in operation 1525 may vary in different embodiments. In the above example, the agent may be allowed to elect to reduce their schedule channel types with minimal impact. For example, the agent may be able to reduce a scheduled voice/chat#1/chat #2/email channel type to a voice/chat#1/email channel type. This would effectively allow the agent to reduce the number of chat sessions from two to one. The agent may be further allowed to reduce the email channel type. However, the certain combinations may not be readily allowed, or may require permission from the administrator to proceed. For example, an agent may elect to only handle one email session at a time (and not even voice calls). This may be unacceptable to the contact center management.

On the other hand, the agent may be allowed to log in using a reduced number of communication sessions/channel types for an initial time period. For example, the first 30 minutes of their shift may be at a single communication channel (e.g., voice). Then, as they 'warm up' and/or volumes increase, they are gradually added to the queues for non-voice channels. Thus, a continual monitoring of the channel types assigned to an agent may be warranted.

Monitoring Agent Performance

The above discussion focuses on the agent accepting certain channel types at the beginning of their shift. The discussion now focuses on monitoring the agent to determine whether the agent is adequately performing with the currently assigned channel types during their shift. One embodiment of the process flow in shown in FIG. 16.

Figure 16:
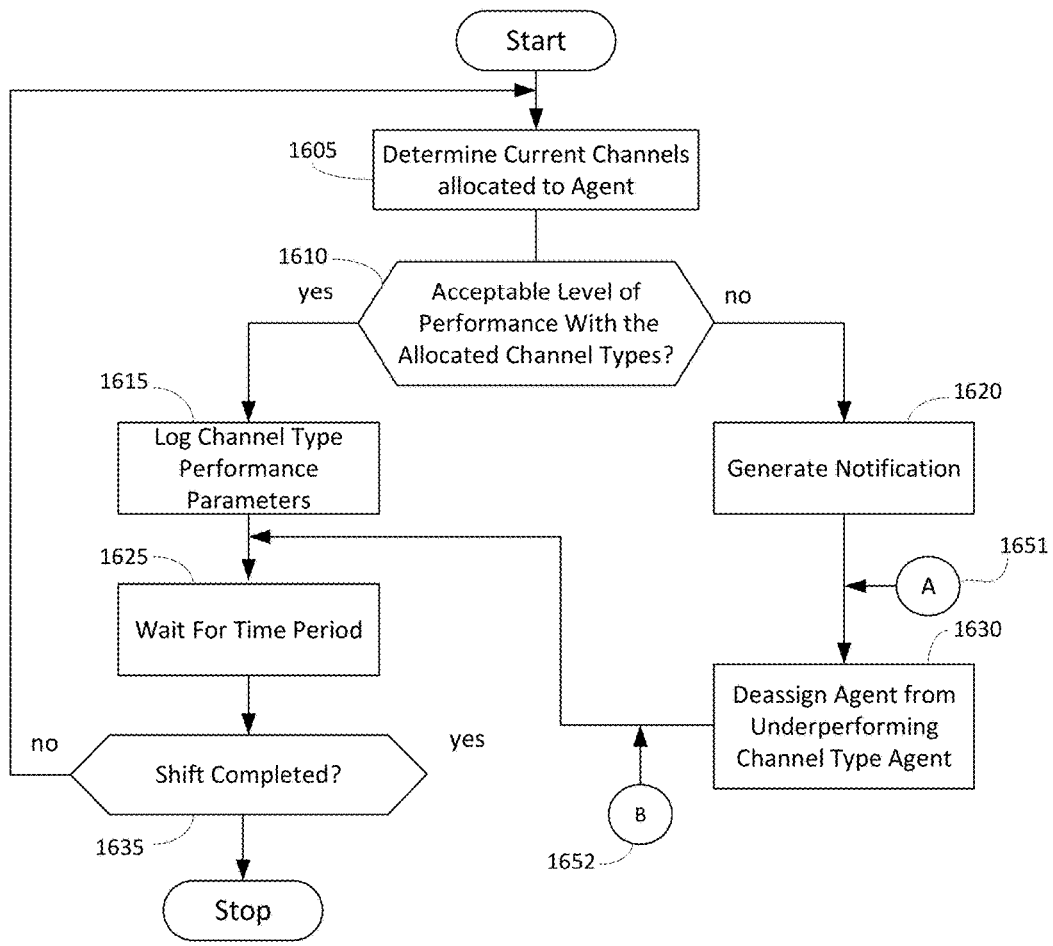
FIGS. 16-17 illustrate an embodiment of a process flow associated with de-assigning channel types/communication sessions to an agent.

Turning to FIG. 16, the process flow begins with determining the current channels the agent is allocated to the agent while working a shift in operation 1605. These are the channel types that the agent is actually working with, not necessarily those scheduled to the agent. (As noted above, these may be altered in some embodiments by the agent at login.) Next, for each channel type and/or communication session of a particular channel type, a test is made to determine whether the agent is working at an acceptable performance level for the allocated channel type/communication session. If the performance level is acceptable in operation 1610, the performance parameters are logged in operation 1615. This allows the determination of a trend or other change in performance over time. (See, e.g., discussion below in regard to FIG. 19.) Next, a wait for a specified time period occurs in operation 1625. Depending on various embodiments, this could be, e.g., from a fraction of a minute to an hour or two. This duration defines the frequency at which the agent's channel specific performance is measured.

If the agent's performance for a particular channel type is not acceptable at operation 1610, then the process continues to operation 1620 where a notification is generated. This notification may be to an administrator, supervisor, reporting system, workforce management system, etc. This notification may be used as input to de-assign the session/channel type from the agent. Next, the agent may be de-assigned from using that particular channel type or the number of sessions allowed for that channel type may be reduced in operation 1630. The process then continues to resume at operation 1625, where a wait occurs before the next measurement.

The test for whether the agent is operating at an acceptable level in operation 1610 may be based on various criteria, and may be different for each channel type. For the voice channel, there are a number of key performance indicators that could be used to measure agent performance. Any of these could be measured, and when an unacceptable deviation occurs with respect to them, then a determination could be made that the agent's performance is unacceptable. The performance criteria for non-voice channel types may also be varied based on various factors, including the channel type itself. In one embodiment, the performance criteria may be based on how the agent dispositions the session. The performance criteria may be based on the average or maximum response time, based on the channel type. For example, a performance metric may expect the agent to respond to a chat message within 120 seconds after receipt. If the agent averages a response time greater than this value, or exceeds this response time in any chat, then an unacceptable performance level may be recorded. This response type may vary for each non-voice channel. For example, the maximum response time on a chat may be set at 120 seconds. The maximum response time for a text message may be set at 180 seconds. Finally, the maximum response time for an email may be set at 60 minutes. Other values may be used to reflect what are deemed to be expected maximum acceptable response times for each channel. Other factors can influence the response time.

Thus, FIG. 16 illustrates one embodiment by which the agent's performance can be monitored for each channel type/communication session, compared to a set of acceptable values for each channel, and if an agent is underperforming, then that channel or number of sessions may be de-assigned/reduced. Other responses are possible, such as increasing the time between sessions. This is a form of pacing, which reduced the frequency in which multiple communication sessions may occur. Thus, rather than spending 75% of the agent's time on multiple sessions, only 25% of the agent's time will involve multiple sessions. However, the number of multiple sessions/channel types is not reduced. Those skilled in the art will recognize that other variations are possible.

Figure 17:
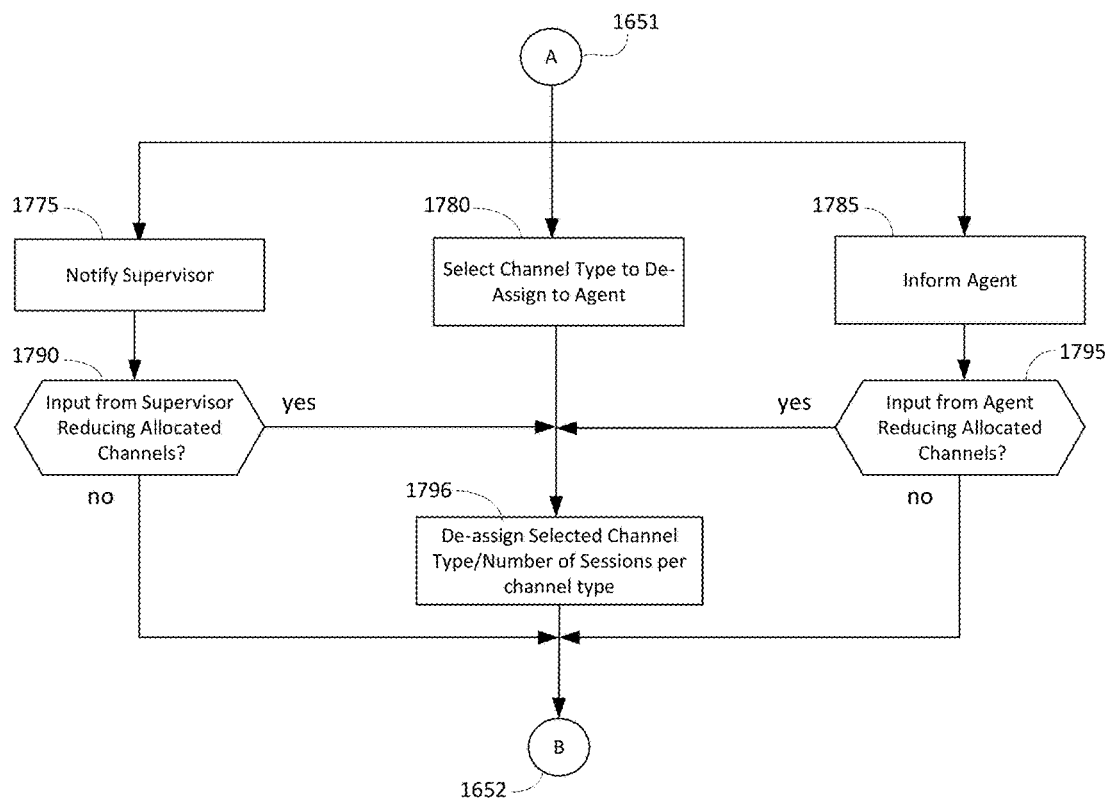

Turning to FIG. 17, further information may be provided on various ways that the underperforming channel type/number of simultaneous sessions may be de-assigned. The process begins at point A 1651, which represents one embodiment that may occur in operation 1630 of FIG. 16. One option is to notify a supervisor or administrator in operation 1775 of circumstances surrounding the agent's performance. The supervisor may then evaluate the information in the notification, and determine that is appropriate to reduce the number of allocated channels/sessions to the agent in operation 1790. In effect, the supervisor may issue a command to de-assign one or more channel types, including the channel type that the agent is underperforming on. If supervisor so commands, then the indicated channel type may be de-assigned in operation 1796.

Another option that may occur is represented in operation 1780. In that operation, the communications handler selects the underperforming channel type/number of simultaneous sessions and then de-assigns it in operation 1796. In this way, the communications handler 150 may 'autocorrect' the situation by removing the channel without human intervention.

Another option that may occur is represented in operation 1785. In this option, the agent is informed in some manner that they are underperforming on a specific channel type. The agent may then elect to self-remove a channel type in order to mediate the situation. If the agent elects to do so in operation 1795, then the channel type is de-assigned in operation 1796. In various embodiments, one, two, or all three options may be provided to allow the reduction of the underperforming channel type.

The above example illustrates one embodiment of how a currently assigned channel type can be de-assigned from an agent in response to underperformance by the agent. In essence, the agent is handling too many channel types (or sessions per channel type) to effectively perform.

Figure 18:
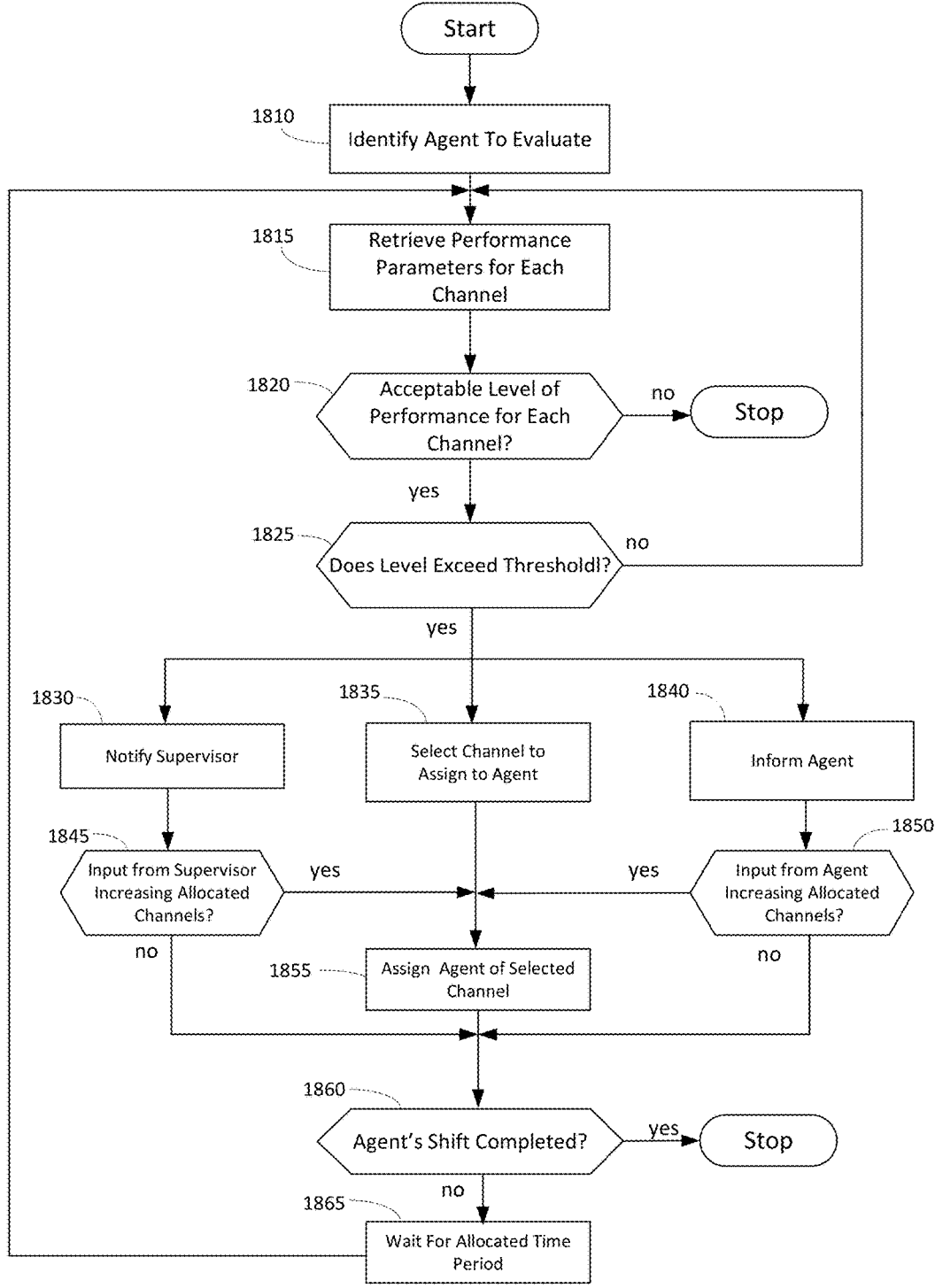
FIG. 18 illustrates an embodiment of a process flow for increasing the number of allocated channel type/communication sessions to an agent.

In other embodiments, the agent's performance may be so good, that the agent is capable of handling an additional channel type or session per channel type. One embodiment of this process flow is shown in FIG. 18. Turning to FIG. 18, the process begins with identifying the agent to evaluate in operation 1810. The performance parameters for that agent for each channel type are retrieved in operation 1815. These parameters may be in various forms (e.g., average, median, highest value, etc.) and may measure each session for each channel type, an aggregate measurement for each channel type, etc. Typically, these parameters will be monitored and stored on a periodic basis. Next, a test occurs to see if the agent is performing at an acceptable level for each of the channels they are assigned to in operation 1820. If the desired performance level is not being met, then the entire process may stop. The concept is that if the agent is not performing adequately, then they will not be allowed to increase the number of channels assigned to them. Since they are unable to adequately perform with the currently assigned channel types, in such a situation, their performance would be expected to further suffer if additional channel types were added.

It the agent does have an acceptable performance level in operation 1820, another test may be performed in operation 1825 to determine whether they are exceeding a performance threshold. In other words, it is not only necessary that the agent's performances is acceptable, it must be very good—good enough to maintain acceptable service when another channel is added. Thus, an agent's performance level in operation 1820 may be barely acceptable, but not good enough to add another channel or session. If the result is negative in operation 1825, the process may loop back to operation 1815 to further make measurements. In other embodiments, the process may stop entirely (not shown).

The flexibility may be required to accommodate agents which may have acceptable, but not stellar performance at various times during their shift. For example, an agent may begin their shift with acceptable performance, but gradually increase their performance after a short time. In one embodiment, a single adequate (or sub-par) performance at any time would preclude the agent from having an additional channel/ session added later in their shift. In other embodiments, if the agent's performance increases above adequate into stellar performance, then an additional channel/session may be added.

If the agent's performance is so good as to allow adding an additional channel type in operation 1825 (i.e., "stellar performance"), then the three options are shown as to how an additional channel type may be assigned to the agent. In one option, shown in operation 1830, a supervisor may be notified that the agent's performance is stellar, and may allow an additional channel type to be assigned. If so, the supervisor may provide input authorizing the addition of a channel type/session to the agent in operation 1845. If this occurs, then the channel type is added in operation 1855.

Another option is for the communications handler to automatically assign the additional channel type to the agent in operation 1835. This avoids requiring any human intervention to do so. A third option is shown in operation 1840, where the agent is informed that there performance allows the assignment of an additional channel type. If the agent agrees to do so in operation 1850, then the additional channel type is added in operation 1855. If the agent does not request an additional channel in operation 1850 or the supervisor does not authorize one in operation 1845, then no further channels are assigned to the agent.

The process proceeds to testing whether the agent's shift is completed in operation 1860, and if so, the process terminates. If the shift is not completed, then the process waits a specific time period in operation 1865, and returns to retrieving the performance parameters in operation 1815 for evaluation. In this manner, the performance of the agent can be monitored throughout their shift at periodic intervals to determine if the agent is able to handle an additional channel.

Figure 19:
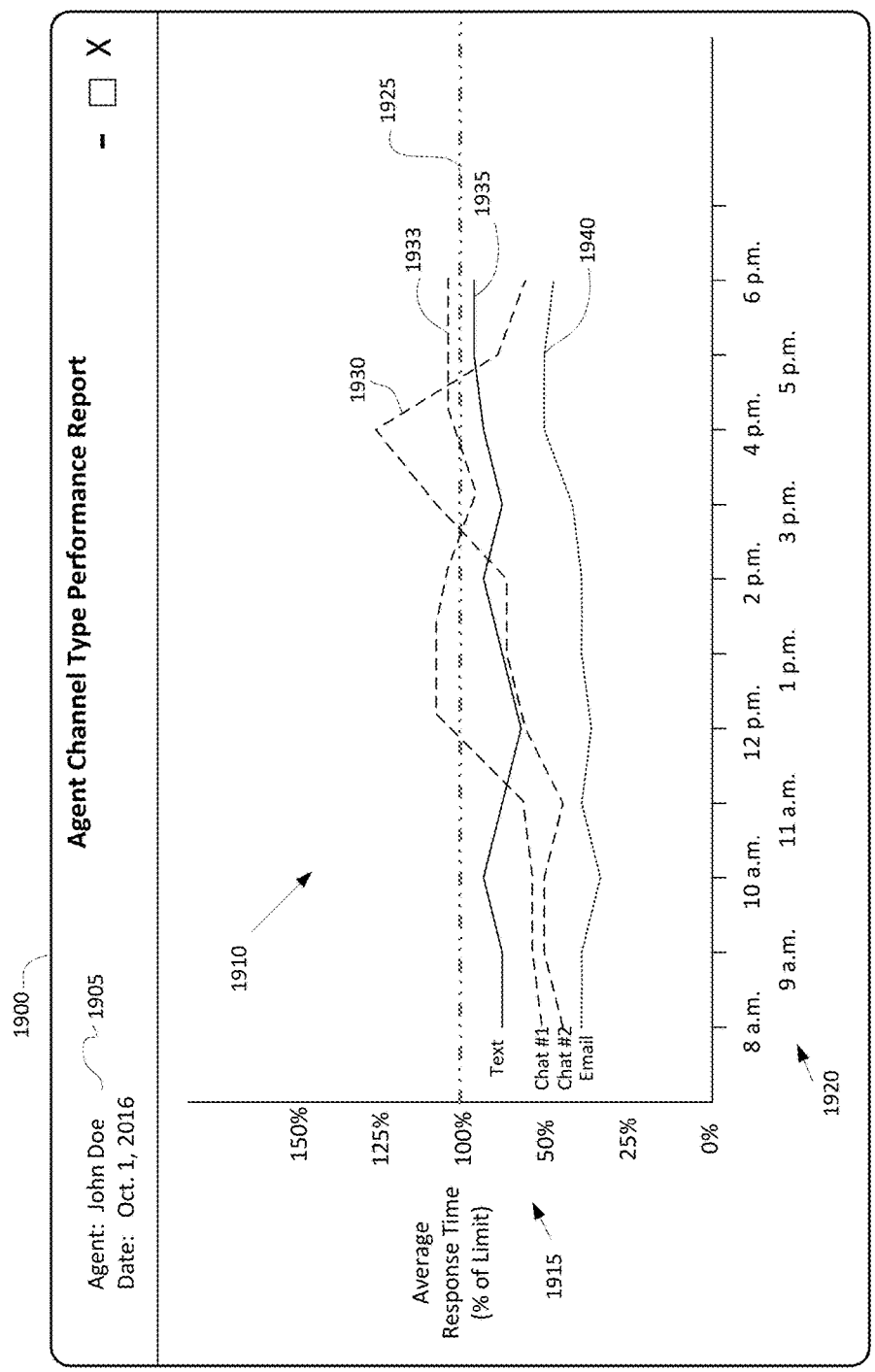
FIG. 19 represents one embodiment of a graphical representation of agent performance values associated with a plurality of communication sessions.

The performance of the agent with respect to each assigned channel type can be maintained, reported, and presented to the agent or the supervisor in various embodiments. Once example is shown in FIG. 19, illustrated in a graphical format. This format may be displayed on a window or screen 1900 on the agent's or supervisor's computer and illustrates the performance of an indicated agent 1905. A graph 1910 is presented that measures the agent's performance for each channel type. In various embodiments, the supervisor is able to retrieve and display such graphs for an indicated agent, whereas the agent would be able to only review their performance chart.

The parameters are shown as time 1920 in the x-axis and average response time 1915 in the y-axis. The average response time is normalized and presented as a percentage value based on a threshold value. Thus, to return to a prior example, if the maximum allowable response time for a chat message is 120 seconds, then 100% would be 120 seconds. Responding at 60 seconds would represent a 50% response time, and 240 seconds would be 200% of the expected response time. If the maximum response time for a text was 180 seconds, then responding in 90 seconds would represent a 50% response time, etc. Using a normalized value in a percentage allows easy comparison of the relative performance on different channels, which may have different absolute parameter values.

FIG. 19 shows a normalized threshold value of 100% 1925. It also shows four distinct non-voice channels—text 1935, chat #1 1933, chat #2 1930, and email 1940. Thus, there are two sessions for the chat channel type. Each graph shows a performance relative to the threshold, and it can be seen that at approximately 12:00 p.m. the performance indicator of chat #1 session exceeds the allowable threshold and that the performance indicator of chat #2 spikes above the allowable threshold at approximately 3:00 p.m. Although FIG. 19 shows that the performance threshold is exceeded by a positive value, it is possible to exceed a performance threshold by a negative value. In other words, "exceeding a threshold" as used herein should be interpreted as extending beyond a threshold value either in a negative or positive direction. This is to provide flexibility in how the performance threshold and performance indicator can be defined in various embodiments.

This graph is one embodiment of presenting information to the agent, supervisor, or in a report. It allows ready identification of those channel types for which the agent is underperforming. The underperformance is represented in this embodiment by exceeding an allowable threshold. Consequently, it could be ascertained from this graph that one of the chat channel types should be removed to improve the agent's performance measurements. In various embodiments, a particular channel could be flagged, highlighted, or otherwise indicated for removal. This could be determined based on the area of the graph over the threshold value, or a duration of time where the graph exceeds the threshold value. Thus, flexibility can be defined as to what triggers removal of the channel.

Other embodiments may use other measures of performance. The disposition of the call may be another measure. The disposition is information entered by the agent reflecting the outcome of the communication. It could be, e.g., that the customer's issue was resolved, a sale was made, or an inquiry was answered. It could be length of session, based on a relative measurement to typical durations by the agent, or other agents handling similar sessions. It could be other measures, and the use of response time is but one embodiment.

Figure 20:
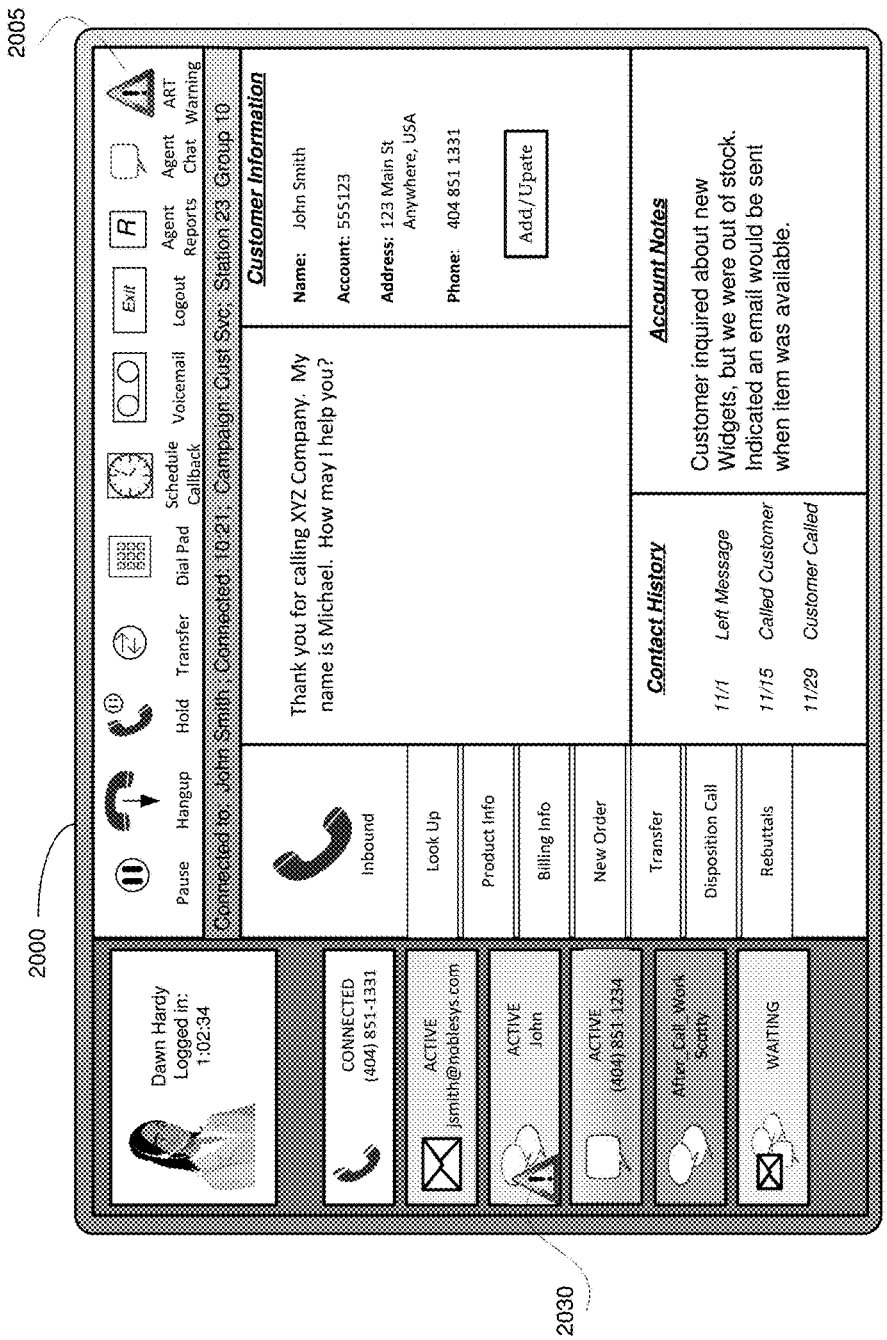
FIG. 20 represents one embodiment of a user interface indicating an icon representing a degradation of agent performance.

When the agent is underperforming on a channel type, the agent could be informed of this condition according to the embodiment shown in FIG. 20. In this embodiment, the agent is presented with a screen 2000 with an icon 2005 highlighted on the agent's toolbar or dashboard. This icon, labeled the "ART Warning" icon, represents a warning that the average response time ("ART") has exceeded a limit for a particular non-voice channel type or communication session. This could represent an average or instantaneous value. The icon may also be highlighted on the particular channel type 2030 to further inform the agent about the associated channel type. Although this embodiment shows one icon, multiple icons could be displayed on the GUI over multiple channel types or communication sessions, if that were the case.

Upon selecting the icon 2005, the agent may be presented with further specific information, such as found in a channel management screen 2100 shown in FIG. 21. Turning to FIG. 21, in this embodiment, the agent is presented with information representing the voice channel 2105 and non-voice channels 2110 currently serviced by the agent. This could represent information in an agent profile, indicating which channel types and/or how many communication sessions for each channel type is supported. Various columns provide information such as the channel type 2115, an indication of whether that channel type is active or not 2120, the name of the campaign that channel type is associated with 2125, and the ability to indicate a de-assignment of that channel 2130. In this embodiment, the agent has selected to de-assign chat #1, resulting in that row 2140 being highlighted. The request to de-assign is indicate by selecting a box 2135. In this manner, the agent may manage their own channel assignments, and elect to remove (or add) channels as appropriate. If the agent elects to de-assign a currently active channel, then the existing session will be allowed to complete first, but thereafter, that channel type is removed from the queue for that agent, so that no more incoming communication sessions are presented to the agent on that channel type.

Exemplary Computer Processing Device

Figure 22:
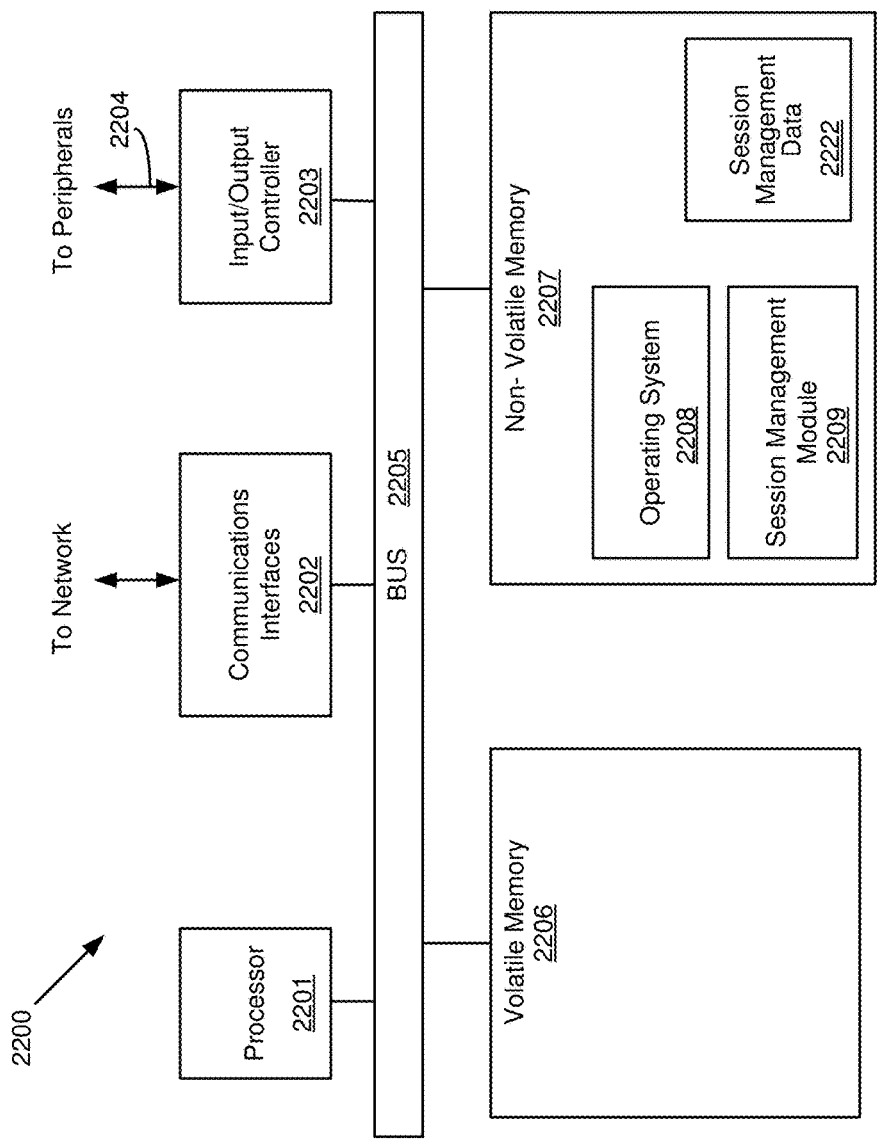
FIG. 22 illustrates an embodiment of a processing system used to provide the various technologies and concepts disclosed herein.

FIG. 22 is an exemplary schematic diagram of a computer processing system that may be used in embodiments of various architectures, such as components shown in the architecture 100 of a contact center in FIG. 1 to practice the technologies disclosed herein. In general, the term "computer processing system" may be exemplified by, for example, but without limitation by any specially configured or programmed: personal computer, server, desktop computer, tablet, smart phone, notebook, laptop, distributed processing system, server, blade, and the like, as well as any combination of devices or entities adapted to perform the functions described herein, such that the resulting system is a specialized processing system configured to perform the functions and capabilities disclosed herein. The computer processing system may also be a specially configured system, designed to optimize the operation of the component in the contact center based in part on the specialized software configured to perform the functions disclosed herein. For example, the "communications handler" could be a computer processing system that is specially configured to perform the functions disclosed herein. A "communications handler" as used herein would be interpreted by one skilled in the art as a special purpose processing system, performing functions that are not typical of a generic computer. This also may be the case for the other components disclosed herein including the various dialing components, SMS gateway, dialing list storage systems, etc.

As shown in FIG. 22, the processing system 2200 may include one or more computing processors 2201 that may communicate with other elements within the processing system 2200 via a bus 2205. The computing processor 2201 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 2200 may also include one or more communications interfaces 2202 for communicating data via a network (such as LAN 170 from FIG. 1) with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 2203 may also communicate with one or more input devices or peripherals using an interface such as, but not limited to: a keyboard, a mouse, a touch screen/display input, microphone, pointing device, etc. The input/output controller 2203 may also communicate with output devices or peripherals, such as displays, printers, speakers, headsets, banner displays, etc.

The computing processor 2201 may be configured to execute instructions stored in volatile memory 2206, non-volatile memory 2207, or other forms of computer readable storage media accessible to the processor 2201. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 2207 may store program code and data, which also may be loaded into the volatile memory 2206 at execution time. For example, the non-volatile memory 2207 may store one or more modules 2209 that may perform the above-mentioned process flows and/or operating system code 2208 containing instructions for performing the process and/or functions associated with the technologies disclosed herein. The module(s) 2209 may also access, generate, or store related data 2222, including, for example, the data described above in conjunction with performing the various aspects of session management in the non-volatile memory 2207, as well as in the volatile memory 2206. This would include, but is not limited to: session related data, communication session performance related metrics, threshold values, agent profile data, and any other data used to perform the disclosed functions and concepts. The volatile memory 2206 and/or non-volatile memory 2207 may be used to store other information including, but not limited to: records, applications, programs, scripts, source code, object code, byte code, compiled code, interpreted code, machine code, executable instructions, or the like. These may be executed or processed by, for example, the computing processor 2201 and may form a part of, or may interact with, the module(s) 2209.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory or propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A non-transitory computer readable medium storing instructions that when executed by a computer processor of a communications handler cause the computer processor to:
provide to a computer for simultaneous display on a first portion of a user interface to an agent of a contact center a defined number of communication session identifiers associated with the agent comprising a first non-voice communication session identifier and a second non-voice communication session identifier, wherein the first non-voice communication session identifier and the second non-voice communication session identifier are both displayed prior to and after selecting the agent to receive either one of an incoming first non-voice communication or an incoming second non-voice communication to the agent, wherein the first non-voice communication and the second non-voice communication have a common channel type;
receive the incoming first non-voice communication at the communications handler;
select the agent to receive the incoming first non-voice communication;
modify an appearance of the first non-voice communication session identifier on the user interface of the computer in response to selecting the agent to receive the incoming first non-voice communication;
further modify the appearance of the first non-voice communication session identifier on the user interface of the computer in response to receiving a first input reflecting the agent selecting the first non-voice communication session identifier;
provide a first text associated with the incoming first non-voice communication for display on a session information pane in a second portion on the user interface of the computer in response to receiving the first input;
receive the incoming second non-voice communication while the first text is displayed to the agent on the user interface;
select the agent to receive the incoming second non-voice communication;
modify an appearance of the second non-voice communication session identifier on the user interface of the computer in response to selecting the agent to receive the incoming second non-voice communication;
receive from the computer a second input reflecting the agent selecting the second non-voice communication session identifier corresponding to the incoming second non-voice communication;
further modify the appearance of the second non-voice communication session identifier on the user interface of the computer in response to receiving the second input; and
present a second text associated with the incoming second non-voice communication on the session information pane in response to receiving the second input.

2. The non-transitory computer readable medium of claim 1, wherein the incoming first non-voice communication is an short message service ("SMS") text and the instructions further cause the computer processor to:
display a telephone number associated with the incoming first non-voice communication in the first non-voice communication session identifier.

3. The non-transitory computer readable medium of claim 1, wherein the incoming second non-voice communication is a chat channel type and the instructions further cause the computer processor to:

display a visual indication in the second communication session identifier on the user interface comprising an icon indicating the incoming second non-voice communication is the chat channel type.

4. The non-transitory computer readable medium of claim 1, wherein the instructions are configured to further cause the computer processor to:

remove the first text from the session information pane on the user interface in response to receiving the second input reflecting the agent selecting the second non-voice communication session identifier.

5. The non-transitory computer readable medium of claim 1, wherein the instructions are configured to further cause the computer processor to:

further alter the appearance of the first non-voice communication session identifier in response to receiving the second input.

6. The non-transitory computer readable medium of claim 5, wherein altering the appearance of the first non-voice communication session identifier comprises altering a background color of the first non-voice communication session identifier.

7. The non-transitory computer readable medium of claim 1, wherein the instructions are configured to further cause the computer processor to:

receive a first response text from the computer in response to the agent entering the first response text in the session information pane after displaying the first text associated with the incoming first non-voice communication on the user interface; and send the first response text to a remote party associated with the incoming first non-voice communication.

8. The non-transitory computer readable medium of claim 1, wherein the instructions are configured to further cause the computer processor to:

retrieve agent session allocation data comprising the defined number indicating how many simultaneous non-voice communication sessions the agent is authorized to handle; and use the agent session allocation data to determine the agent is authorized to receive the incoming second non-voice communication.

9. The non-transitory computer readable medium of claim 2, wherein the instructions are configured to further cause the computer processor to:

display a name of a remote party on the user interface associated with the incoming second non-voice communication, wherein the name is displayed in the second non-voice communication session identifier.

10. The non-transitory computer readable medium of claim 1, wherein the instructions are configured to further cause the computer processor to:

receive a disposition code entered by the agent, wherein the disposition code is associated with the incoming second non-voice communication; and in response to receiving the disposition code, cause the second non-voice communication session identifier to reflect the incoming second non-voice communication is no longer active.

11. The non-transitory computer readable medium of claim 1, wherein the instructions are configured to further cause the computer processor to:

receive an incoming voice communication;
select the agent to receive the incoming voice communication; and present information related to the incoming voice communication on the session information pane on the user interface thereby removing the second text on the session information pane.

12. The non-transitory computer readable medium of claim 11, wherein the instructions are configured to further cause the computer processor to:

determine a response timer associated with the second non-voice communication has expired; and display on the computer in the second non-voice communication session identifier a warning icon to the agent in response to the response timer expiring.

13. The non-transitory computer readable medium of claim 11, wherein the instructions are configured to further cause the computer processor to:

display a contact history for the incoming second non-voice communications on the computer used by the agent.

14. A non-transitory computer readable medium storing instructions that when executed by a computer processor cause the computer processor to:

provide to a computer for simultaneous display on a first portion of a user interface to an agent of a contact center a defined number of communication session identifiers associated with the agent comprising a first non-voice communication session identifier and a second voice communication session identifier, wherein the first non-voice communication session identifier and the second voice communication session identifier are both displayed prior to and after selecting the agent to receive either one of an incoming first non-voice communication or an incoming voice communication;

receive the incoming first non-voice communication at a communications handler;

select the agent of the contact center to receive the incoming first non-voice communication;

modify the first non-voice communication session identifier on the user interface of the computer in response to selecting the agent to receive the incoming first non-voice communication;

present a first text associated with the incoming first non-voice communication on a second portion of the user interface of the computer in response to receiving a first input reflecting the agent selecting the first non-voice-oriented communication session identifier;

receive the incoming voice communication while the first text is presented to the agent on the user interface;

select the agent to receive the incoming voice communication;

route the incoming voice communication to the computer used by the agent without waiting for the agent to select the voice communication session identifier;

modify an appearance of the voice communication session identifier on the user interface in response to selecting the agent to receive the incoming voice communication; and present information associated with the incoming voice communication on the second portion of the user interface comprising a current session information pane on the user interface without waiting for the agent to select the voice communication session identifier.

15. The non-transitory computer readable medium of claim 14, wherein the instructions are configured to further cause the computer processor to:

alter an appearance of the non-voice communication session identifier on the user interface after presenting the information associated with the incoming voice communication.

16. A non-transitory computer readable medium storing instructions that when executed by a processor cause the computer processor to:

provide to a computer for simultaneous display on a first portion of a user interface of a computer used by an agent of a contact center a defined number of communication session identifiers associated with the agent comprising a non-voice communication session identifier and a voice communication session identifier, wherein the first non-voice communication session identifier and the second voice communication session identifier are both displayed prior to and after selecting an agent to receive either one of an incoming voice communications or an incoming non-voice communication;

receive the incoming voice communication at a communications handler;

select the agent to receive the incoming voice communication;

route the incoming voice communication to the computer used by the agent without waiting for the agent to select the voice communication session identifier;

alter an appearance of the voice communication session identifier after selecting the agent to receive the incoming voice communication;

present a voice-oriented session information pane on a second portion of the user interface of the computer after selecting the agent to receive the incoming voice communication without waiting for the agent to select the voice communication session identifier;

receive the incoming non-voice communication while the agent is connected to a party on the incoming voice communication;

select the agent to receive the incoming non-voice communication;

provide a visual indication on the non-voice communication session identifier indicating the incoming non-voice communication is pending after selecting the agent to receive the incoming non-voice communication while the voice-oriented session information pane on the user interface is presented to the agent;

receive from the computer an indication of the agent selecting the non-voice communication session identifier corresponding to the incoming non-voice communication; and replace the voice-oriented session information pane on the user interface with a non-voice-oriented session information pane while maintaining the incoming voice communication to the computer and displaying the voice communication session identifier.

17. The non-transitory computer readable medium of claim 16, where the instructions further cause the computer processor to:

receive from the computer a second indication reflecting the agent selecting the voice communication session identifier corresponding to the incoming voice communication after the voice oriented session information pane has been replaced by the non-voice-oriented session information pane; and in response to receiving the second indication, replace the non-voice-oriented session information pane with the voice-oriented session information pane on the user interface.

18. The non-transitory computer readable medium of claim 16, wherein providing the visual indication on the user interface indicating the incoming non-voice communication is pending comprises altering visual characteristics of the non-voice communication session identifier corresponding to the incoming non-voice communication.

19. The non-transitory computer readable medium of claim 16, wherein the non-voice-oriented session information pane displays a function for the agent to indicate a disposition code after completion of the non-voice communication, and wherein the computer readable medium further comprises instructions causing the computer processor to:

receive the disposition code from the computer entered by the agent; and in response to receiving the disposition code, cause the non-voice communication session identifier to be altered so as to reflect the non-voice communication is no longer active.

20. The non-transitory computer readable medium of claim 16, wherein selecting the agent to receive the incoming non-voice communication comprises:

determine the agent is authorized to receive the incoming non-voice communication; and determine that the agent is available to receive the incoming non-voice communication.

* * * * *